United States Patent
Hirano et al.

(10) Patent No.: US 9,511,471 B2
(45) Date of Patent: Dec. 6, 2016

(54) BURNISHING DEVICE AND BURNISHING METHOD USING IT

(71) Applicant: Mitsubishi Hitachi Power Systems, Ltd., Nishi-ku, Yokohama, Kanagawa (JP)

(72) Inventors: Atsuya Hirano, Tokyo (JP); Keiko Shishime, Tokyo (JP); Takeshi Kudo, Tokyo (JP); Kazuto Mikazuki, Tokyo (JP); Koki Sato, Tokyo (JP); Hideo Yoda, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 62 days.

(21) Appl. No.: 14/079,906

(22) Filed: Nov. 14, 2013

(65) Prior Publication Data

US 2014/0165351 A1    Jun. 19, 2014

(30) Foreign Application Priority Data

Dec. 18, 2012  (JP) ................................ 2012-276072

(51) Int. Cl.
    *B24B 39/00* (2006.01)
    *B24B 39/02* (2006.01)
    *G05B 19/404* (2006.01)

(52) U.S. Cl.
    CPC ............ *B24B 39/003* (2013.01); *B24B 39/02* (2013.01); *G05B 19/404* (2013.01); *Y10T 29/47* (2015.01)

(58) Field of Classification Search
    CPC ..... B24B 39/003; B24B 39/02; G05B 19/404; Y10T 29/47
    See application file for complete search history.

(56) References Cited

U.S. PATENT DOCUMENTS 8,250,720 B2 *  8/2012  Tomioka ................. B24B 39/04
                                                                29/90.01
2009/0106961 A1   4/2009  Tomioka et al.

FOREIGN PATENT DOCUMENTS

EP    0 330 734 A2   9/1989
JP    11-58201 A     3/1999
(Continued)

OTHER PUBLICATIONS

European Search Report dated Jan. 24, 2014 (Five (5) pages).
(Continued)

*Primary Examiner* — Richard Chang
(74) *Attorney, Agent, or Firm* — Crowell & Moring LLP

(57) ABSTRACT

A burnishing device and method are provided that enable burnishing processing to be reliably performed on a surface included in an object to be processed and having a change in height and inclination angle. The device includes a burnishing tool having a pressing unit that rotationally presses a surface of an object to be processed, the surface having a change in height and inclination angle; a tool driving device configured to move the burnishing tool; a strain sensor configured to detect the strain amount of the burnishing tool; and a computer that calculates pressing force to be applied by the pressing unit in a normal direction of the surface of the object to be processed, calculates correction amount of displacement of the tool driving device in a pressing direction based on calculated pressing force and stored pressing force in advance, and outputs the correction amount to the tool driving device.

5 Claims, 15 Drawing Sheets

(56) References Cited

FOREIGN PATENT DOCUMENTS

| | | |
|---|---|---|
| JP | 2003-39315 A | 2/2003 |
| JP | 2005-288557 A | 10/2005 |
| JP | 2005-305604 A | 11/2005 |
| JP | 2006-123059 A | 5/2006 |
| JP | 2008-290173 A | 12/2008 |
| JP | 2011-106332 A | 6/2011 |
| JP | 2012-98217 A | 5/2012 |

OTHER PUBLICATIONS

Japanese Office Action issued in counterpart Japanese Application No. 2012-276072 dated May 31, 2016 (three (3) pages).

* cited by examiner

Fig.5
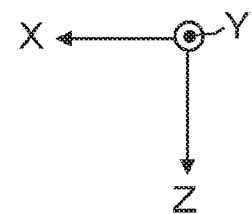
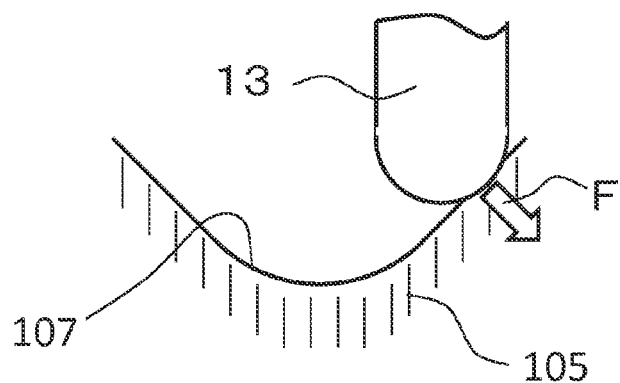
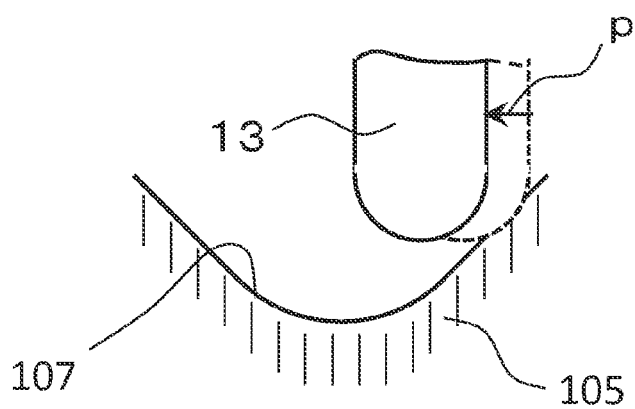
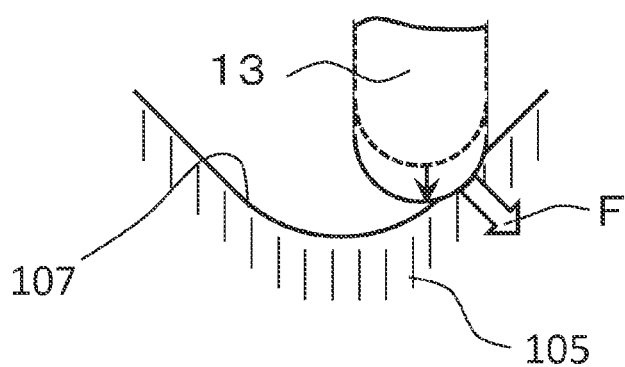

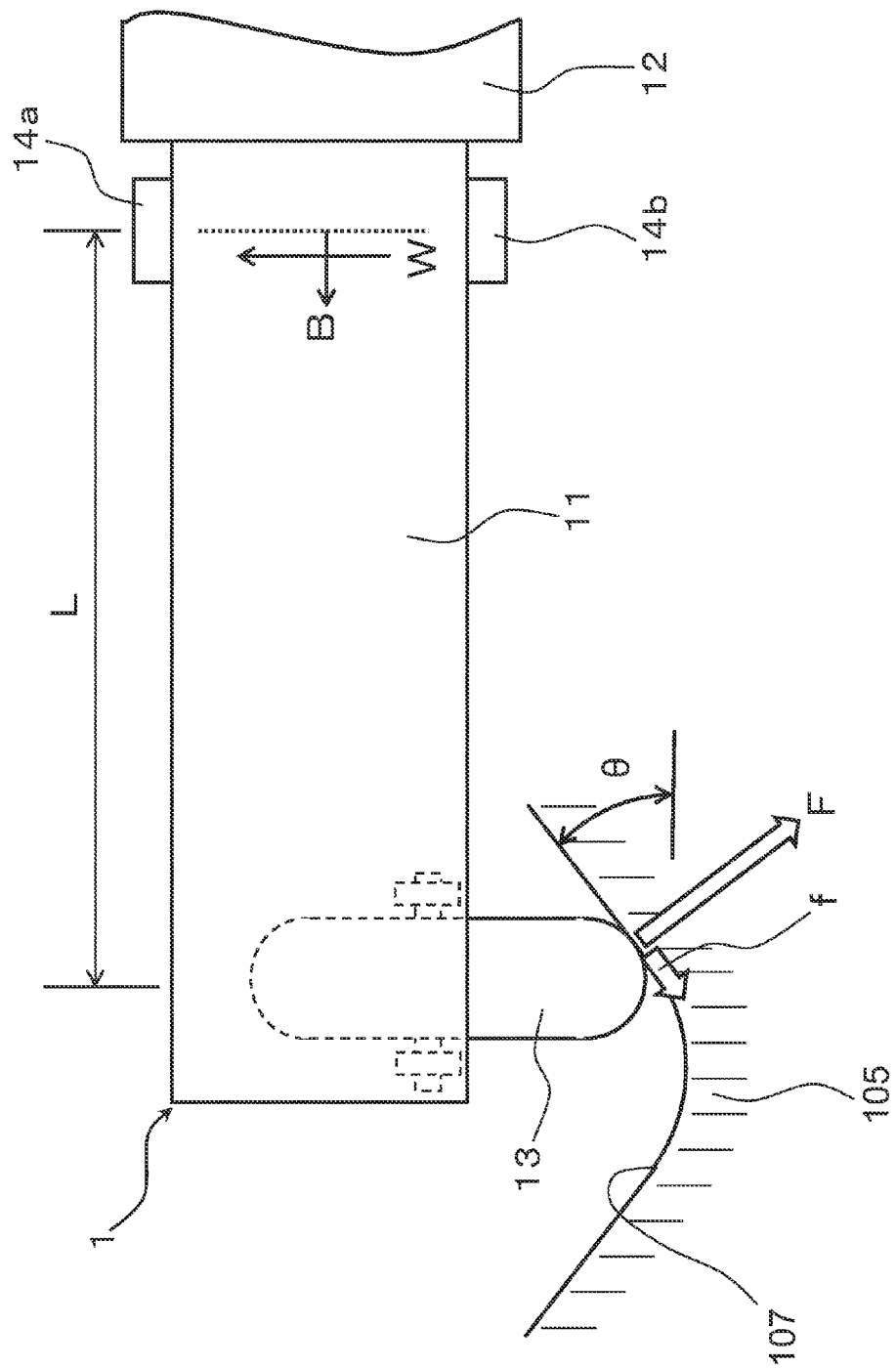

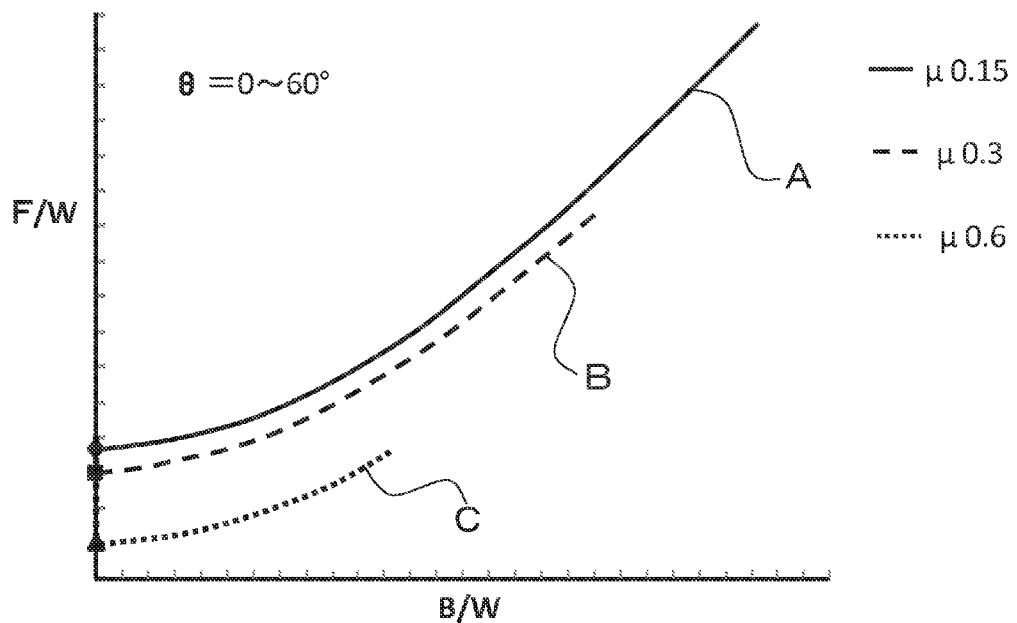
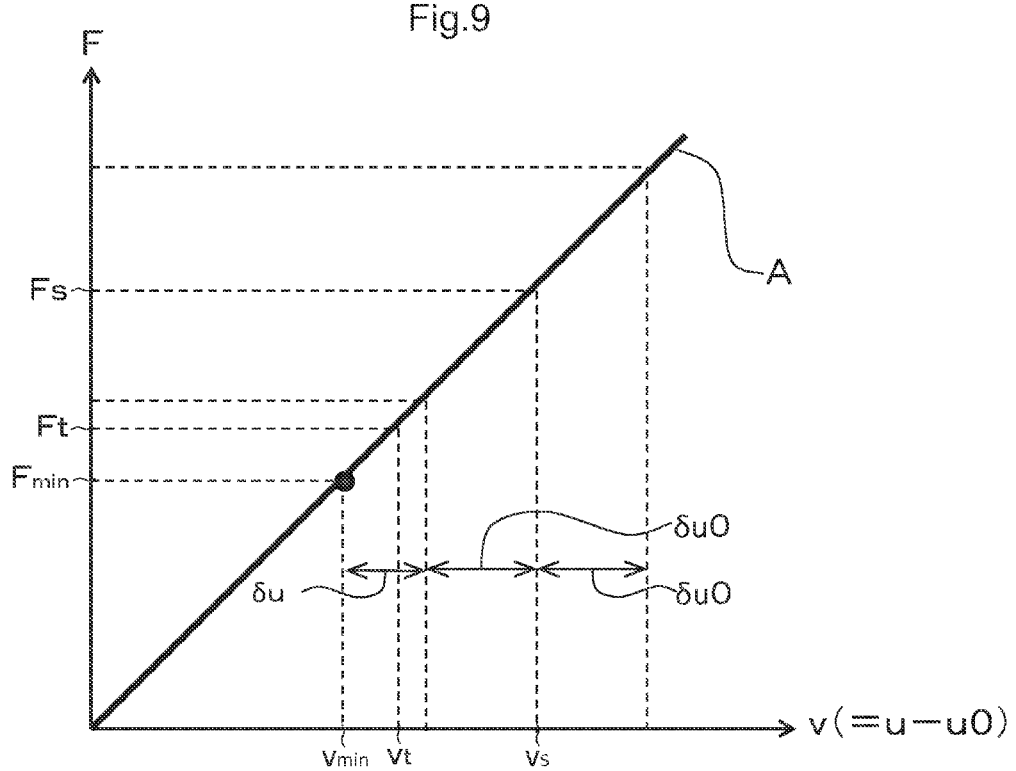

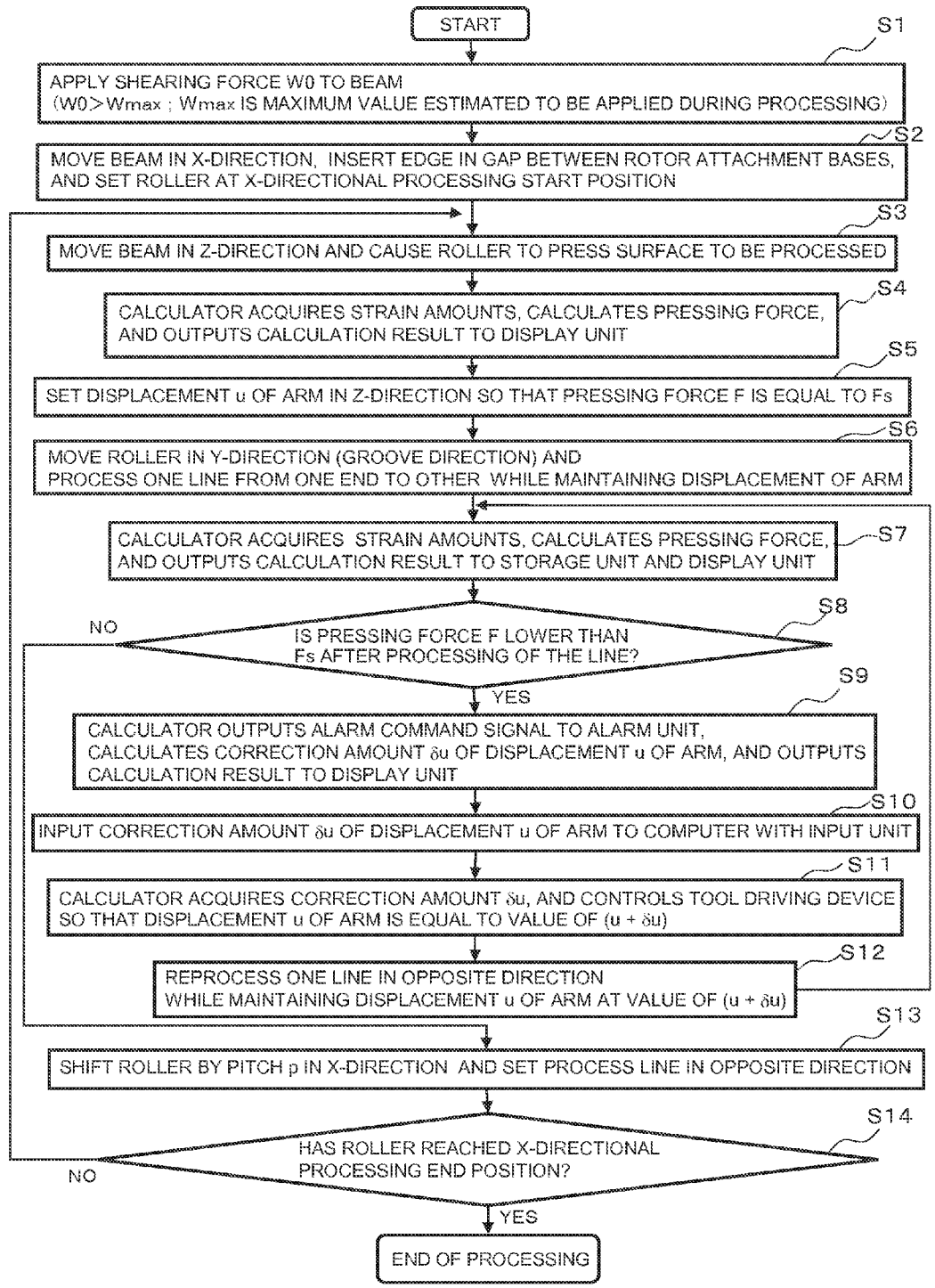

BURNISHING DEVICE AND BURNISHING METHOD USING IT

BACKGROUND OF THE INVENTION

The present invention relates to a burnishing device and a burnishing method using it.

As a method for finishing a surface in order to improve wear resistance and fatigue strength of a metal material, burnishing is known. As a burnishing tool to be used for the burnishing, there is a tool described in JP-2005-288557-A (hereinafter referred to as Patent Document 1).

The burnishing tool described in Patent Document 1 is a roller burnishing tool that includes a cylindrical shank, a head, and a roller for compaction. The head is arranged in the shank through a pivot shaft and pivots by work pressing force. The burnishing tool further includes a biasing unit, a biasing force adjusting unit, and a biasing force converting unit. The biasing unit is arranged in the cylindrical shank and biases in a shank axis direction. The biasing force adjusting unit adjusts biasing force generated by the biasing unit. The biasing force converting unit transmits the biasing force to a head shaft and changes a direction of the biasing force to a direction in which the head shaft pivots. The burnishing tool controls the work pressing force to be generated upon rolling compaction.

SUMMARY OF THE INVENTION

A part that connects turbine blades of a steam turbine or the like to a turbine rotor disk has a structure in which an attachment base located on the side of the turbine blades is engaged with an attachment base located on the side of the turbine rotor disk. The connection part balances centrifugal force applied to the turbine blades upon an operation of the turbine and thus needs to have sufficient fatigue resistance.

Although Patent Document 1 describes the fact that an edge of the burnishing tool is pressed against an inner surface of a cylindrical object, a unit for measuring pressing force is not provided. If the invention described in Patent Document 1 is applied to the part that connects the turbine blades to the turbine rotor disk, there is a problem that compressive residual stress is not reliably formed on a processed part of an attachment base due to displacement of the set attachment base or an error of a dimension of the attachment base. Especially, for a portion (such as the attachment base) of which the height and inclination angle of a surface (to be processed) vary, an error between an input position of the portion and the actual position of the portion easily occurs. Thus, it is likely that the portion may not be sufficiently processed by the burnishing.

The present invention was devised to solve the aforementioned problems, and an object of the invention is to provide a burnishing device and a burnishing method that enable burnishing to be reliably performed on a surface, which is included in an object to be processed and is to be processed by burnishing and has a change in height and inclination angle.

In order to solve the aforementioned problems, configurations described in claims are used, for example.

The present specification includes multiple schemes for solving the aforementioned problems. As an example of the schemes, a burnishing device including a burnishing tool having a pressing unit that rotationally presses a surface of an object to be processed, the surface having a change in height and inclination angle; a tool driving device configured to move the burnishing tool; a strain sensor configured to detect a strain amount of the burnishing tool; and a computer configured to calculate pressing force to be applied by the pressing unit in a normal direction of the surface of the object to be processed, the calculation being on the basis of the strain amount detected by the strain sensor, calculate a correction amount of displacement of the tool driving device in a pressing direction, the calculation being on the basis of the calculated pressing force and stored pressing force in advance, and output the correction amount to the tool driving device.

According to the invention, the pressing force to be applied by the pressing unit in the normal direction of the surface of the object to be processed is calculated on the basis of the strain amount of the burnishing tool, the pressing unit presses the surface by the calculated pressing force, and the burnishing processing can be reliably performed on the surface, which is included in the object to be processed and has a change in height and inclination angle. As a result, the service life of the object to be processed can be increased.

Challenges, configurations, and effects other than those described above are clarified by the following description of embodiments.

BRIEF DESCRIPTION OF THE DRAWINGS

FIG. 5 is a diagram describing a burnishing process to be performed by the burnishing device according to the first embodiment of the invention.

FIG. 7 is a diagram illustrating the relationship between pressing force and friction force that are applied to an inclined surface (to be processed) and shearing force and axial force that are applied to the beam upon the burnishing performed by the burnishing device according to the first embodiment of the invention.

FIG. 8 is a characteristic diagram illustrating relationships of balance between the pressing force, the friction force, the shearing force of the beam, and the axial force of the beam upon the burnishing performed by the burnishing device according to the first embodiment of the invention.

FIG. 9 is a characteristic diagram illustrating the relationship between the pressing force and the deflection of the beam upon the burnishing performed by the burnishing device according to the first embodiment of the invention.

FIG. 10 is a flowchart of a burnishing method to be performed by the burnishing device according to the first embodiment of the invention.

DESCRIPTION OF THE PREFERRED EMBODIMENTS

Hereinafter, a burnishing device and a burnishing method according to first to third embodiments of the invention are described with reference to the accompanying drawings.

First, the configuration of a steam turbine to be processed using the burnishing method by the burnishing device according to the first to third embodiments of the invention is described with reference to FIGS. 1 and 2.

Figure 1:
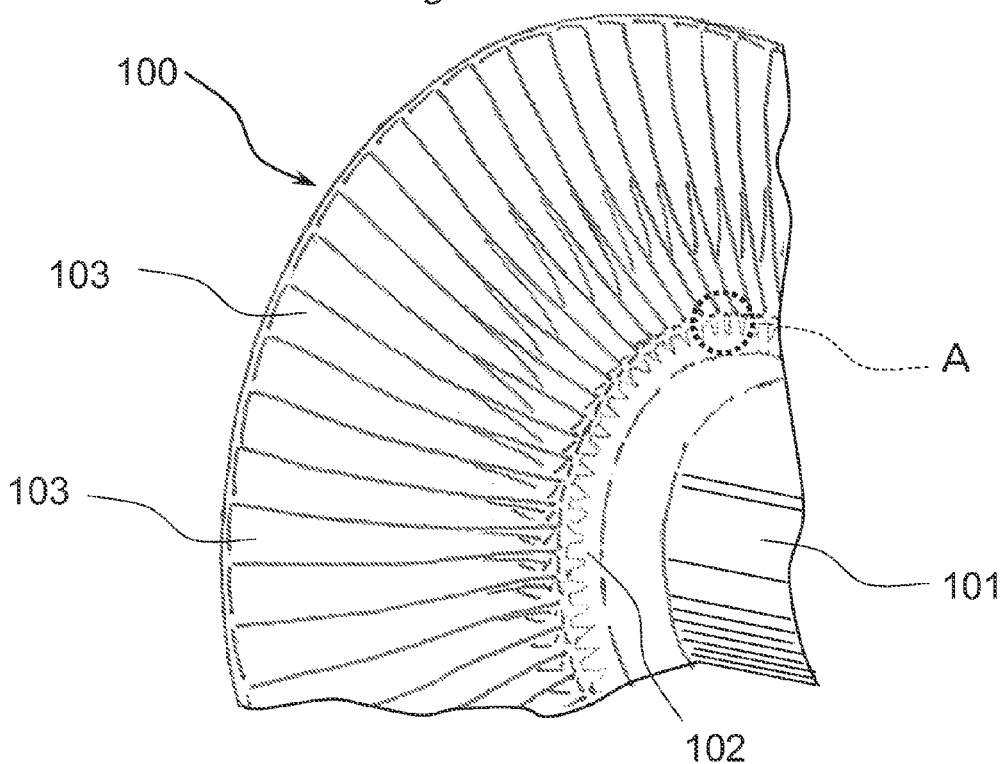
FIG. 1 is a perspective view partially illustrating turbine blades of a steam turbine to be processed using a burnishing method by a burnishing device according to each embodiment of the invention.

FIG. 1 is a perspective view partially illustrating turbine blades of the steam turbine to be processed using the burnishing method by the burnishing device. FIG. 2 is an enlarged perspective view of a part indicated by a symbol A in FIG. 1, which shows a connection of turbine blades and a turbine rotor disk in the steam turbine.

In FIG. 1, the turbine 100 includes a rotor shaft 101, the turbine rotor disk 102, and the plurality of turbine blades 103. The turbine rotor disk 102 is attached to an outer circumferential portion of the rotor shaft 101. The turbine blades 103 are connected to an outer circumferential portion of the turbine rotor disk 102 at intervals.

Figure 2:
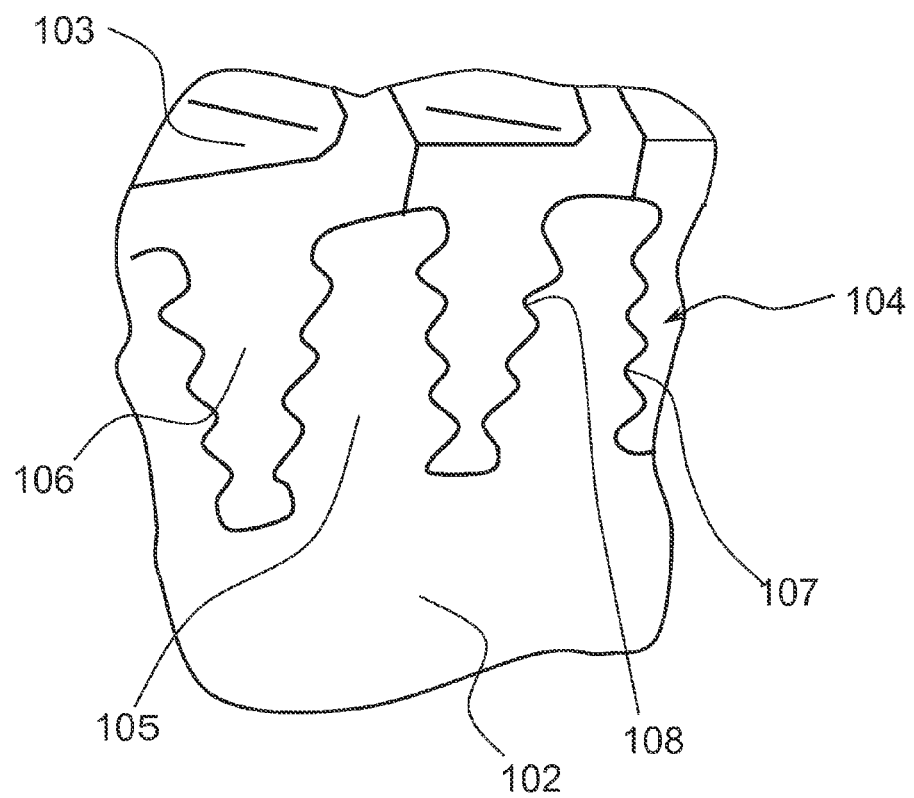
FIG. 2 is an enlarged perspective view of a part indicated by a symbol A in FIG. 1, which shows a connection of turbine blades and a turbine rotor disk in the steam turbine.

As illustrated in FIG. 2, the part 104 that connects the turbine rotor disk 102 to the turbine blades 103 has such a structure: rotor attachment bases 105 of the turbine rotor disk 102 are engaged with blade attachment bases 106 of the turbine blades 103, attachment bases 105 and 106 both having Christmas tree shape in cross section.

During an operation of the turbine, the connected rotor shaft 101 is rotated by causing the turbine blades 103 to receive steam, and a generator (not illustrated) generates power by rotational driving force of the rotor shaft 101. In this case, centrifugal force acts on the rotating turbine blades 103 and is supported by the connection part 104 having the engagement structure. Thereby, stress is concentrated at groove bottom portions 107 of the rotor attachment bases 105 and groove bottom portions 108 of the blade attachment bases 106. Thus generated locally high stress may cause damage such as a fatigue crack or stress corrosion cracking under long-term use.

As a technique for suppressing such damage, burnishing, which suppresses the occurrence or progress of a crack or the like by forming a compressive residual stress layer on a surface, is effective. The burnishing has advantages that the formed compressive residual stress layer is deep, a processed surface is smooth, and the processing cost is low.

First Embodiment

Next, the burnishing device according to the first embodiment of the invention is described with reference to FIGS. 3 to 6.

Figure 3:
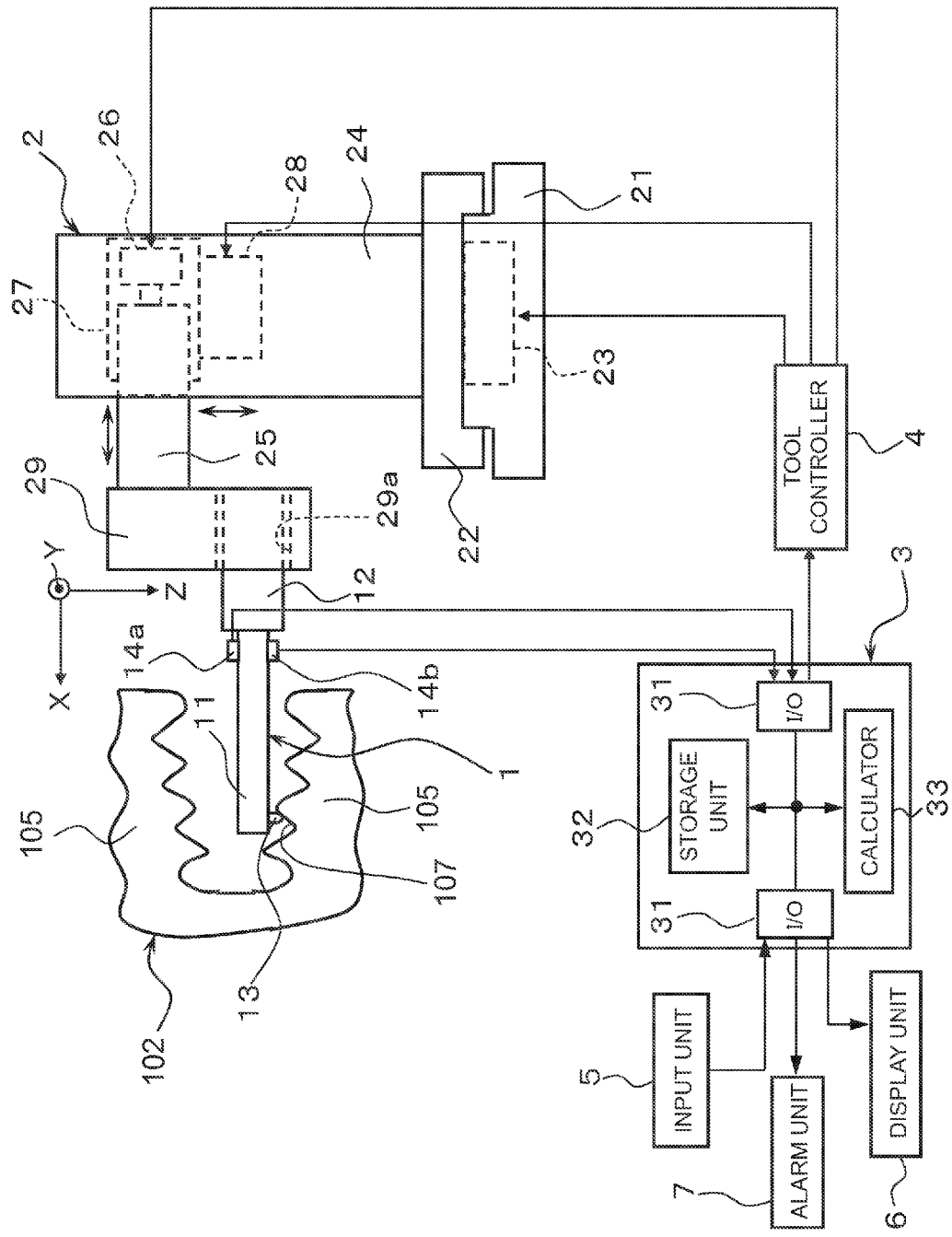
FIG. 3 is an outline configuration diagram illustrating a burnishing device according to a first embodiment of the invention.
Figure 4:
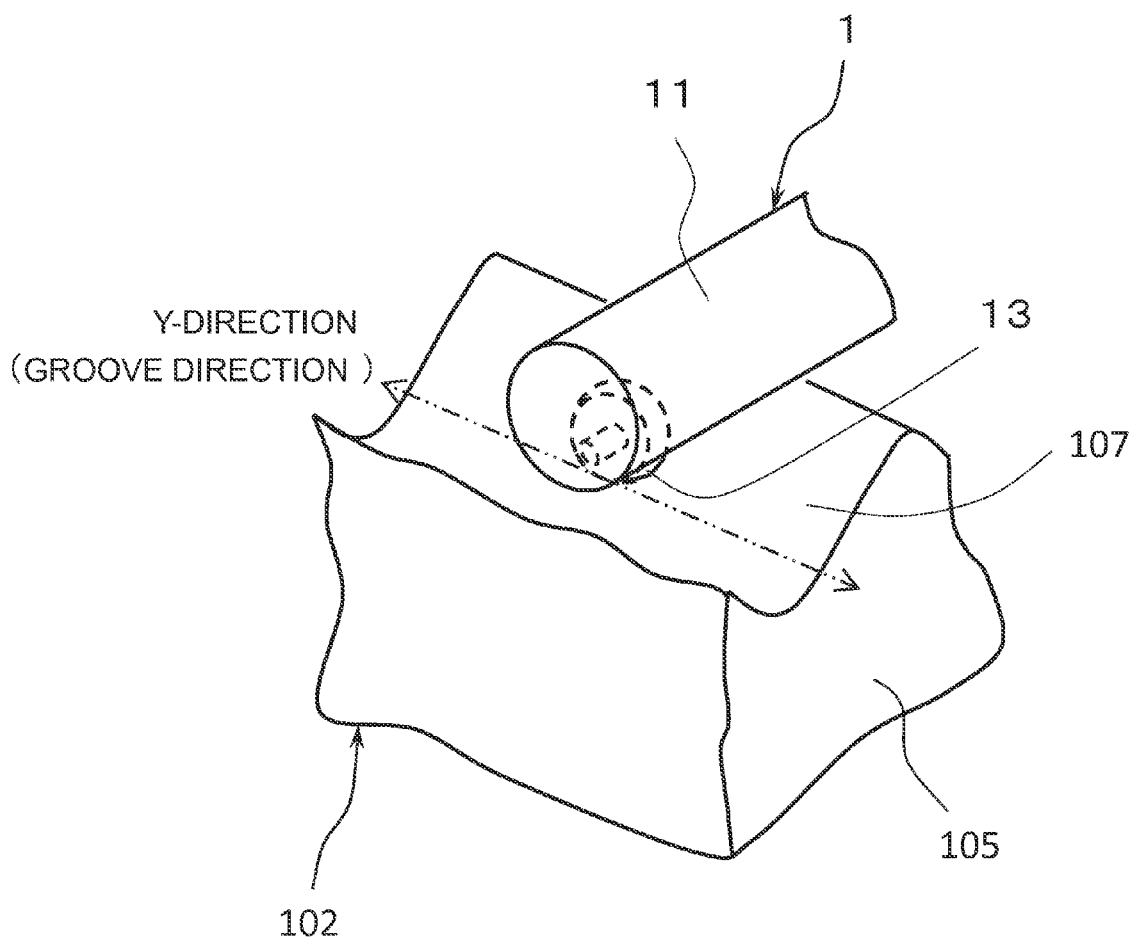
FIG. 4 is an enlarged perspective view illustrating a roller of a burnishing tool that constitutes a part of the burnishing device (illustrated in FIG. 3) according to the first embodiment of the invention.
Figure 6:
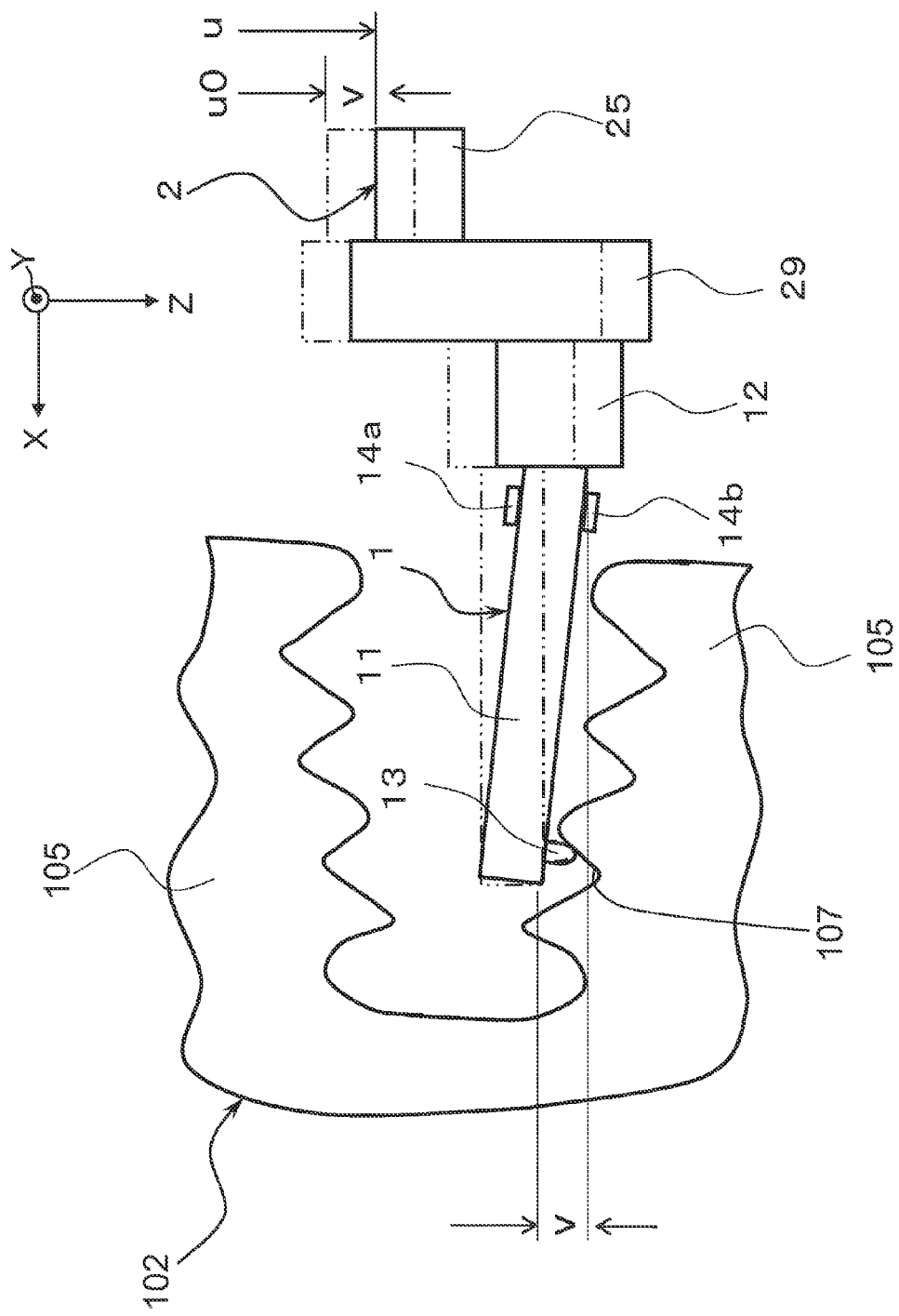
FIG. 6 is a diagram illustrating the relationship between deflection of a beam and displacement of an arm upon the burnishing performed by the burnishing device according to the first embodiment of the invention.

FIG. 3 is an outline configuration diagram illustrating the burnishing device according to the first embodiment of the invention. FIG. 4 is an enlarged perspective view illustrating a roller of a burnishing tool that constitutes a part of the burnishing device (illustrated in FIG. 3) according to the first embodiment of the invention. FIG. 5 is a diagram describing a burnishing process to be performed by the burnishing device according to the first embodiment of the invention. FIG. 6 is a diagram illustrating the relationship between deflection of a beam and displacement of an arm upon the burnishing performed by the burnishing device according to the first embodiment of the invention. Reference numerals that are illustrated in FIGS. 3 to 6 and the same as those illustrated in FIGS. 1 and 2 indicate the same parts as those illustrated in FIGS. 1 and 2, and a detailed description thereof is omitted. In FIGS. 3, 5, and 6, a direction in which the burnishing tool is inserted is X-direction, a direction in which the groove bottom portions of the rotor attachment bases extend is Y-direction, and a direction in which the burnishing tool presses the rotor attachment base is Z-direction.

The present embodiment describes an example in which a surface processed inside of the rotor attachment base 105 of the rotor disk is subjected to burnishing. Prior to burnishing, the surface processed is formed in a narrow inner surface shape and has a change in height and inclination angle.

In FIG. 3, the burnishing device includes a burnishing tool 1 and a tool driving device 2. The burnishing tool 1 forms a compressive residual stress layer on an object (rotor attachment bases 105) to be processed. The tool driving device 2 moves the burnishing tool 1 in X-, Y-, and Z-directions.

The burnishing tool 1 uses a beam scheme in consideration of access to the groove bottom portions 107 of the rotor attachment bases 105 having the narrow inner surface. In the beam scheme, deflection reaction force of a beam 11 is used to press an edge of the burnishing tool 1 against the surface to be processed. The burnishing tool 1 includes the beam 11, a fixing portion 12, and a roller 13. The beam 11 can be inserted in a narrow portion of the rotor attachment base 105. The fixing portion 12 is arranged at one edge of the beam 11 in a longitudinal direction of the beam 11. The roller 13 serves as a pressing unit that presses the surface (to be processed) of the object to be processed. As illustrated in FIG. 4, the roller 13 is capable of rotating around an axial direction (X-direction) parallel to the longitudinal direction of the beam 11.

The tool driving device 2 includes a base portion 21, a Y-axis stage 22, a Y-axis driving device 23, a holding portion 24, an arm 25, an X-axis driving device 26, an arm holding portion 27, a Z-axis driving device 28, and a tool gripping portion 29. The Y-axis stage 22 is capable of moving in Y-direction relative to the base portion 21. The Y-axis driving device 23 moves the Y-axis stage 22. The holding portion 24 stands on the Y-axis stage 22. The arm 25 is attached to the holding portion 24 and capable of moving in X-direction. The X-axis driving device 26 moves the arm 25 relative to the holding portion 24 in X-direction. The arm holding portion 27 holds the arm 25 and is capable of moving relative to the holding portion 24 in Z-direction. The Z-axis driving device 28 moves the arm holding portion 27 relative to the holding portion 24 in Z-direction. The tool gripping portion 29 is arranged at an edge of the arm 25.

The tool gripping portion 29 has a chucking hole 29a. The burnishing tool 1 is fixed to the chucking hole 29a by inserting the fixing portion 12 of the burnishing tool 1 in the chucking hole 29a and bolting the fixing portion 12.

The burnishing tool 1 is moved in X-direction by the X-axis driving device 26 and inserted in a gap between the rotor attachment bases 105. Next, the burnishing tool 1 is moved in Z-direction by the Z-axis driving device 28 and the roller 13 of the burnishing tool 1 is pressed against the groove bottom portion 107 of the rotor attachment base 105. While the roller 13 is pressed against the groove bottom portion 107, the burnishing tool 1 is moved in Y-direction by the Y-axis driving device 23 and the roller 13 is moved in a groove direction (Y-direction) while rotationally pressing the groove bottom portion 107 (or processing one line), as illustrated in FIG. 4.

When the roller 13 finishes moving from one end to the other end of the groove bottom portion 107 in Y-direction while pressing the surface to be processed, the roller 13 is moved in X-direction by a predetermined pitch p by the X-axis driving device 26 as illustrated in FIG. 5. In addition, the Z-axis driving device 28 is driven to cause the roller 13 so be pressed against the groove bottom portion 107 again and the roller 13 is moved from the other end to one end of the groove bottom portion 107 in Y-direction while pressing the groove bottom portion 107. By repeating this operation, the burnishing is completed on the overall groove bottom portion 107.

In this case, local plastic deformation occurs at a contact portion of the surface (to be processed) by pressing force F applied to the surface (to be processed) in a normal direction of the surface by the roller 13, and compressive residual stress is formed at the contact portion. The pressing force F applied to the surface (to be processed) in the normal direction correlates with the magnitude of the compressive residual stress formed by the burnishing.

Necessary allowable pressing force Ft is determined in advance to obtain predetermined compressive residual stress or higher, and deflection v of the beam 11 is controlled by the tool driving device 2 so that the pressing force F is not lower than the allowable pressing force Ft.

A configuration that is provided so control the deflection v of the beam 11 and effect of the configuration are described below.

As illustrated in FIG. 6, the deflection v of the beam 11 is represented by the following Equation (1) using displacement u of the arm 25 of the tool driving device 2 in Z-direction (pressing direction).

$$v = u - u0(x) \tag{1}$$

In Equation (1), u0 is standard displacement of the arm 25 in Z-direction when the roller 13 starts contacting the surface (to be processed) of the object (rotor attachment base 105) to be processed. In Equation (1), u0 is a function of a coordinate x of the groove bottom portion 107 in X-direction.

In the present embodiment, therefore, the pressing force F to be applied by the roller 13 is measured to control the deflection v of the beam 11.

Returning to FIG. 3, strain sensors 14a and 14b are arranged on upper and lower surfaces (both edges of the beam 11 in a shearing direction upon the burnishing) of the beam 11 in the vicinity of the fixing portion 12. The strain sensors 14a and 14b are connected to the computer 3. The strain sensors 14a and 14b detect the strain amounts of the beam 11 and output detection signals corresponding to the amounts of the strains to the computer 3.

The computer 3 is connected to a tool controller 4 that drives the X-axis driving device 26, Y-axis driving device 23, and Z-axis driving device 28 of the tool driving device 2 and controls the position of the arm 25. In addition, the computer 3 is connected to an input unit 5, a display unit 6, and an alarm unit 7. The input unit 5 is a keyboard or the like and provides a command to display data measured upon the burnishing and provides a various commands (from a user) such as processing requirements for the burnishing and a control value of displacement u of the arm 25 of the tool driving device 2. The display unit 6 displays the data measured upon the burnishing and the like. The alarm unit 7 provides an alarm sound.

The computer 3 includes an input/out-out (I/O) unit 31, a storage unit 32, and a calculator 33. The storage unit 32 stores various characteristic diagrams and various set values. The calculator 33 calculates, on the basis of the detection values received from the strain sensors 14a and 14b and the characteristic diagrams, the pressing force F to be applied by the roller 13 to the surface (to be processed) in the normal direction of the surface to be processed. The calculator 33 compares the calculated pressing force F with a set value and calculates a correction amount δu of the displacement u of the arm 25 in the pressing direction on the basis of the calculated pressing force F, the characteristic diagrams, and the set value.

The storage unit 32 stores a characteristic diagram (refer to FIG. 8 described later) indicating relationships of balance between the pressing force F, friction force, shearing force of the beam 11, and axial force of she beam 11 upon the burnishing in order for the calculator 33 to calculate the pressing force F. In addition, the storage unit 32 stores the allowable pressing force Ft that is the set value to be used for the comparison with the calculated pressing force F and determination of whether the calculated pressing force F is equal to or larger than pressing force that enables predetermined compressive residual stress to be formed. Furthermore, the storage unit 32 stores a characteristic diagram indicating the relationship between the pressing force and the deflection of the beam 11 and stores allowable deflection vt (of the beam 11) corresponding to the allowable pressing force Ft on the characteristic diagram in order for the calculator 33 to calculate the correction amount δu of the displacement u of the arm 25 (refer to FIG. 9 described later).

In addition, the storage unit 32 stores the processing requirements (for the burnishing) input from the input unit 5, the result of calculating the pressing force F by the calculator 33, and the like.

The calculator 33 acquires the detection signals of the strain sensors 14a and 14b, calculates the pressing force F on the basis of the detection signals of the strain sensors 14a and 14b and the characteristic diagram (illustrated in FIG. 8 described later) stored in the storage unit 32, and outputs the result of the calculation to the storage unit 32 and the display unit 6. In addition, the calculator 33 determines whether or not the calculated pressing force F is lower than the allowable pressing force Ft stored in the storage unit 32. If the calculator 33 determines that the calculated pressing force F is lower than the allowable pressing force Ft, the calculator 33 outputs an alarm command signal to the alarm unit 7, calculates the correction amount δu (of the displacement u of the arm 25) causing the pressing force F to be equal to or higher than the allowable pressing force Ft, and outputs the result of calculating the correction amount δu to the display unit 6. Furthermore, the calculator 33 outputs, to the tool controller 4, a correction displacement command to change the displacement u of the arm 25 by the correction amount δu on the basis of the correction amount δu (of the displacement u of the arm 25) input from the input unit 5.

The input/output unit 31 receives the detection signals of the strain sensors 14a and 14b and a command signal of the input unit 5. In addition, the input/output unit 31 outputs the result (received from the calculator 33) of calculating the pressing force F to the display unit 6, outputs the alarm command signal received from the calculator 33 to the alarm unit 7, outputs the result (received from the calculator 33) of calculating the correction amount δu of the displacement u of the arm 25 to the display unit 6, and outputs the correction displacement command received from the calculator 33 to the tool controller 4.

Next, a specific method for calculating the pressing force F (to be applied by the roller 13) by the calculator 33 on the basis of values measured by the strain sensors 14a and 14b is described with reference to FIGS. 7 and 8.

FIG. 7 is a diagram illustrating the relationship between the pressing force and the friction force that are applied to the inclined surface (to be processed) and the shearing force and the axial force that are applied to the beam upon the burnishing performed by the burnishing device according to the first embodiment of the invention. FIG. 8 is a characteristic diagram illustrating the relationships of balance between the pressing force, the friction force, the shearing force of the beam, and the axial force of the beam upon the burnishing performed by the burnishing device according to the first embodiment of the invention. Reference numerals and symbols that are illustrated in FIGS. 7 and 8 and the same as those illustrated in FIGS. 1 to 6 indicate the same parts as those illustrated in FIGS. 1 to 6, and a detailed description thereof is omitted.

The shearing force W and axial force B of the beam 11 that are illustrated in FIG. 7 are calculated from the following Equations (2) and (3) using strain amounts εa and εb measured by she strain sensors 14a and 14b, respectively.

$$W = (\epsilon b - \epsilon a)/2 \cdot E \cdot Z/L \quad (2)$$

$$B = (\epsilon a + \epsilon b)/2 \cdot E \cdot A \quad (3)$$

In Equations (2) and (3), E is a Young's modulus of the beam 11, Z is a section modulus of the beam 11, A is a cross-sectional area of the beam 11, and L is a distance between the roller 13 and the strain sensors 14A and 14b.

At an edge portion of the beam 11, the pressing force F applied by the roller 13 to the surface to be processed in the normal direction of the surface to be processed, the friction force f applied in the tangential direction of the surface to be processed, the shearing force W of the beam 11, and the axial force B of the beam 11 are balanced. When the inclination angle of the surface to be processed is θ (absolute value), the following Equations (4) to (6) are established on the basis of balance of forge acting in vertical and horizontal directions.

$$F \cos\theta + f \sin\theta = W \quad (4)$$

$$F \sin\theta - f \cos\theta = B \quad (5)$$

$$f = \min\{\mu F, F \tan\theta\} \quad (6)$$

In Equation (6), μ is a coefficient of friction.

When the inclination angle θ of the surface to be processed is small, the shearing force W of the beam 11 is generated on the basis of the deflection v of the beam 11, the shearing force W and the pressing force F and the friction force f are balanced, and the axial force B of the beam 11 is 0. In this case, since the roller 13 does not slide on the surface to be processed and the forces are balanced, μF>F tan θ and the friction force f is equal to F tan θ.

On the other hand, if the inclination angle θ of the surface to be processed is large, horizontal force of only the pressing force F, the friction force f, and the shearing force W of the beam 11 is not balanced, the roller 13 tries to slide on the surface to be processed and the axial force B is applied to the beam 11. In this case, since the roller 13 tries to slide on the surface to be processed, μF<F tan θ and the friction force f is equal to μF.

The relationships of Equations (4) to (6) can be represented by the characteristic diagram illustrated in FIG. 8. In FIG. 8, the ordinate indicates the ratio F/W of the pressing force F applied by the roller 13 to the shearing force W of the beam 11, and the abscissa indicates the ratio B/W of the axial force B of the beam 11 to the shearing force W of the beam 11. In FIG. 8, a solid line A, a broken line B, and a dotted line C are characteristic curved lines obtained in the cases where the respective coefficients μ of friction are 0.15, 0.3, and 0.6. Here, an appropriate coefficient μ of friction is selected on the basis of results measured by a separate examination.

Since the shearing force W and the axial force B are calculated using Equations (2) and (3) from the values measured by the strain sensors 14a and 14b, the ratio F/W indicated by the ordinate is calculated using the characteristic curved line A, B or C selected on the basis of the result of examining the coefficient μ of friction from the ratio B/W indicated by the abscissa and determined by the calculated axial force B and the shearing force W. The pressing force F can be calculated from the ratio F/W.

If the axial force B of the beam 11 is 0, the ratio F/W indicated by the ordinate is not uniquely determined, and a value (plot in FIG. 8) on a curved line is used in order to estimate a low ratio F/W for safety. In this case, if the coefficient μ of friction is 0.6, an error of the ratio F/W indicated by the ordinate is up to 14%.

In this manner, the pressing force F can be calculated without measuring the inclination angle θ for the burnishing to be performed on the object (to be processed) of which the inclination angle θ of the surface (to be processed) such as the rotor attachment base 105 varies.

Next, a specific method for calculating the correction amount δu of the displacement u of the arm 25 by the calculator 33 is described with reference to FIG. 9.

FIG. 9 is a characteristic diagram illustrating the relationship between the pressing force and the deflection of the beam upon the burnishing performed by the burnishing device according to the first embodiment of the invention. In FIG. 9, the ordinate indicates the pressing force F applied by the roller 13, and the abscissa indicates the deflection v of the beam 11. A characteristic curved line A illustrated in FIG. 9 indicates the relationship between the pressing force F and the deflection v of the beam when a condition that causes the ratio F/W in FIG. 8 to be smallest is selected.

In FIG. 9, the allowable pressing force Ft and the allowable deflection vt corresponding to the allowable pressing force Ft are set values to be used to obtain the predetermined compressive residual stress.

Even if the standard displacement u0 varies by the maximum variation δu0 during the time when one line of the groove bottom portion 107 of the rotor attachment base 105 is processed, initial pressing force Fs and initial deflection vs corresponding to she initial pressing force Fs are set so that the pressing force F applied by the roller 13 is maintained at the allowable pressing force Ft or higher.

The initial pressing force Fs is a standard value to be used to determine a start position of the displacement u of the arm 25 for the processing of one line.

A variation in the standard displacement u0 during the processing of one line occurs due to rotational displacement of the rotor attachment base 105 in Z-direction upon setting of the rotor attachment base 105 and an error of dimensions of the rotor attachment base 105. For example, an initial value of the maximum variation δu0 of the standard displacement u0 is set to 0.5 mm. When the pressing force F applied by the roller 13 is lower than the allowable pressing force Ft and the burnishing processing is performed again, the maximum variation δu0 is changed on the basis of the correction value δu of the displacement to of the arm 25.

The allowable pressing force Ft, the allowable deflection vt, the initial pressing force Fs, the initial deflection vs, and the characteristic diagram are stored in the storage unit 32.

In FIG. 9, the minimum deflection vmin is calculated from the minimum pressing force Fmin that is lower than the allowable pressing force Ft and among pressing force F measured during the time when one line of the rotor attachment base 105 is processed in the groove direction. The correction amount δu of the displacement u of the arm 25 is calculated according to the following Equation (7) using the minimum deflection vmin, the initial deflection vs, and the maximum variation δu0 of the standard displacement u0, $$\delta u = (vs - v\min) - \delta u0 \quad (7)$$

In this manner, when the displacement u of the arm 25 is changed by the correction amount δu, the pressing force F becomes equal to or higher than the allowable pressing force Ft, as is apparent from FIG. 9.

The characteristic curved line A illustrated in FIG. 9 indicates the relationship between the pressing force F and the deflection v when the condition that causes the ratio F/W indicated in the characteristic diagram of FIG. 8 to be smallest is selected. Since the shearing force W is in proportion to the deflection v, the ratio F/v is also smallest. The pressing force F calculated from the characteristic curved line A is set to a low value for safety.

Next, a burnishing method that is performed by the burnishing device according to the first embodiment of the invention is described with reference to FIGS. 3 to 6 and 8 to 12.

Figure 11:
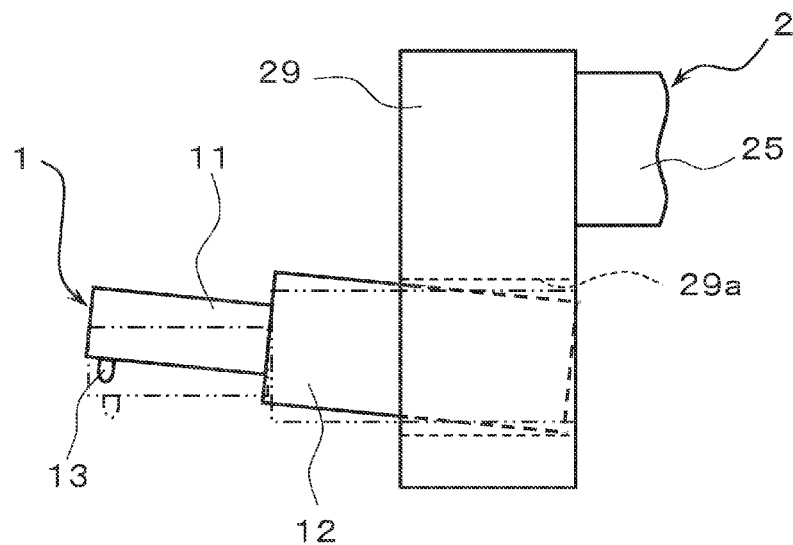
FIG. 11 is a diagram illustrating displacement of a chucking of the burnishing tool that constitutes the part of the burnishing device according to the first embodiment of the invention.
Figure 12:
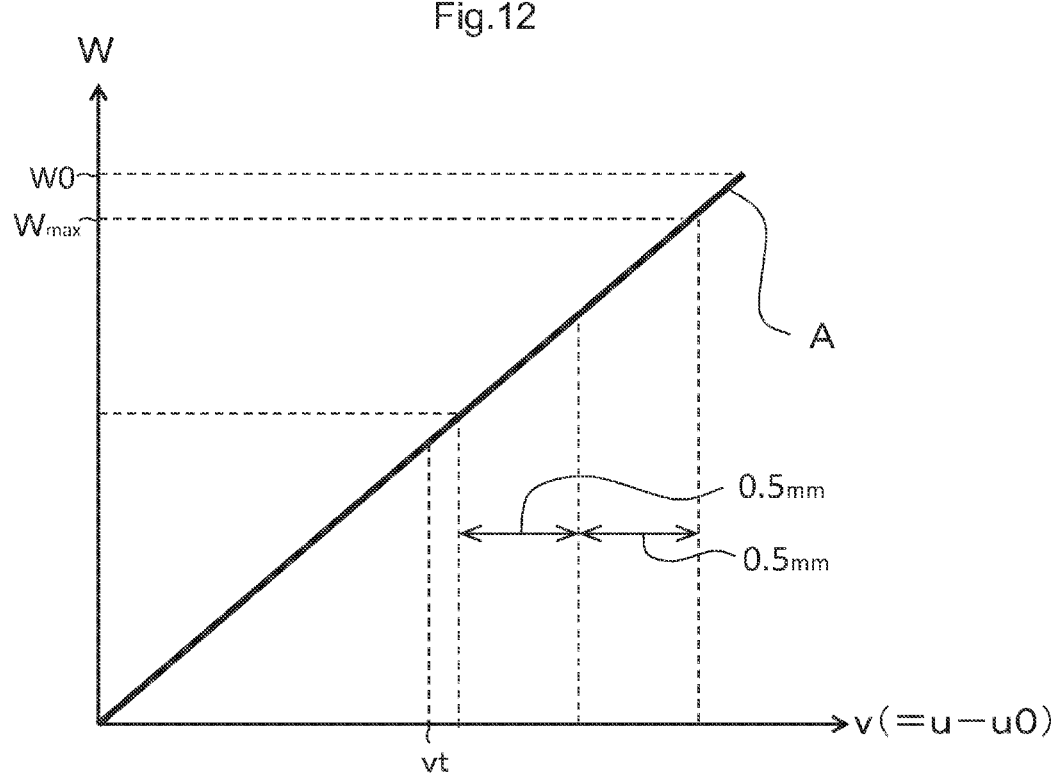
FIG. 12 is a characteristic diagram illustrating the relationship between the shearing force of the beam and the deflection of the beam upon the burnishing performed by the burnishing device according to the first embodiment of the invention.

FIG. 10 is a flowchart of the burnishing method to be performed by the burnishing device according to the first embodiment of the invention. FIG. 11 is a diagram illustrating displacement of a chucking of the burnishing tool that constitutes a part of the burnishing device according to the first embodiment of the invention. FIG. 12 is a characteristic diagram illustrating the relationship between the shearing force of the beam and the deflection of the beam upon the burnishing performed by the burnishing device according to the first embodiment of the invention. Reference numerals and symbols that are illustrated in FIGS. 10 to 12 and the same as those illustrated in FIGS. 1 to 9 indicate the same parts as those illustrated in FIGS. 1 to 9, and a detailed description thereof is omitted. In FIG. 10, the direction in which the burnishing tool is inserted is X-direction, the direction in which the groove bottom portions of the rotor attachment bases extend is Y-direction, and the direction in which the burnishing tool presses the rotor attachment base is Z-direction.

As illustrated in FIG. 10, shearing force W0 that is higher than the maximum shearing force Wmax estimated to be applied to the beam 11 upon the burnishing processing is applied to the beam 11 before the burnishing processing (in step S1).

The maximum shearing force Wmax is shearing force applied to the beam 11 due to the maximum variation of the standard displacement u0 during the time when one line of the groove bottom portion 107 illustrated in FIG. 3 is processed in the groove direction (Y-direction).

When shearing force that is equal to or higher than a certain level is applied to the beam 11, the chucking is displaced in the burnishing tool 1 inserted in and fixed to the chucking hole 29a of the tool gripping portion 29, as illustrated in FIG. 11. In FIG. 11, the burnishing tool 1 indicated by a two-dot chain line is in a state in which the chucking is not displaced, and the burnishing tool 1 indicated by a solid line is in a state in which the chucking is displaced.

If the shearing force W0 that is higher than the maximum shearing force Wmax estimated to be applied to the beam 11 upon the burnishing processing is applied to the beam 11 in advance and the chucking of the burnishing tool 1 is displaced, further displacement of the chucking during the burnishing processing can be suppressed by the processing performed by the burnishing tool 1 in the state in which the chucking is displaced.

If the shearing force W0 is applied to the beam 11 in advance and the chucking of the burnishing tool 1 is not displaced, shearing force that is equal to or higher than the shearing force W0 is not applied to the beam 11 during the processing, and it is considered that the chucking of the burnishing tool 1 is not displaced.

It is, therefore, possible to suppress a reduction in the pressing force F to a value lower than the allowable pressing force Ft due to displacement of the chucking of the burnishing tool 1 during the processing.

Next, a method for determining the maximum shearing force Wmax of the beam 11 is described with reference to FIG. 12.

FIG. 12 is a characteristic diagram illustrating the relationship between the shearing force of the beam 11 and the deflection of the beam 11 upon the burnishing performed by the burnishing device according to the first embodiment of the invention. In FIG. 12, the ordinate indicates the shearing force W of the beam 11, and the abscissa indicates the deflection v of the beam 11. A solid line A illustrated in FIG. 12 is a characteristic curved line indicating the relationship between the deflection of the beam and the shearing force of the beam when the ratio B/W is 0 and causes the ratio F/W to be smallest in FIG. 8.

It is assumed that the variation in the standard displacement u0 during the time when one line is processed is in a range of ±0.5 mm. In this case, the maximum shearing force Wmax is determined so that she deflection v is equal to or larger than the allowable deflection vt while the variation in the standard displacement u0 is in the range of ±0.5 mm. In this case, the maximum variation δu0 in the standard displacement u0 is set to an initial value of 0.5 mm.

Since the characteristic curved line A illustrated in FIG. 12 indicates the relationship between the deflection of the beam and the shearing force of the beam when the ratio B/W is 0 and causes the ratio F/W to be smallest in FIG. 8, the maximum shearing force Wmax (of the beam) calculated from the characteristic curved line A is set to a high value for safety.

Returning to FIG. 10, the X-axis driving device 26 of the tool driving device 2 illustrated in FIG. 3 is driven to move the beam 11 in X-direction. The edge of the beam 11 is inserted in a gap between the rotor attachment bases 105, and the roller 13 is set at an X-directional processing start position at which the groove bottom portion 107 of the rotor attachment base 105 starts to be processed (in step S2).

Next, the Z-axis driving device 28 is driven to move the beam 11 in Z-direction (pressing direction) and cause the roller 13 to press the groove bottom portion 107 (in step S3). When the roller 13 presses the groove bottom portion 107, the beam 11 is deflected, and the strain sensors 14a and 14b detect strain amounts and output she strain amounts to the calculator 33, as illustrated in FIG. 6. Every time the strain sensors 14a and 14b detect the strain amounts after step S3, the strain sensors 14a and 14b output the strain amounts to the calculator 33.

The calculator 33 acquires the strain amounts detected by the strain sensors 14a and 14b, calculates the pressing force F to be applied by the roller 13 on the basis of the amounts of the strains and the characteristic diagram (illustrated in FIG. 8) stored in the storage unit 32, and outputs the result of calculating the pressing force F to the display unit 6 (in step S4). Thus, the display unit 6 displays the pressing force F.

The displacement u of the arm 25 in Z-direction is set so that the pressing force F applied by the roller 13 is equal to the initial pressing force Fs (in step S5). As described above, the initial pressing force Fs is set so that even when the standard displacement u0 varies by the maximum variation δu0 (the Maximum variation is 0.5 mm), the pressing force F applied by the roller 13 is maintained at the allowable pressing force Ft or higher.

While the displacement u of the arm 25 is maintained in the state in which the pressing force F is equal to the initial pressing force Fs, the Y-axis driving device 23 is driven to cause the roller 13 to process one line from one end to the other end of the groove bottom portion 107 in Y-direction (groove direction) (in step S6), as illustrated in FIG. 4. During the time when the line is processed, the deflection v of the beam 11 and the pressing force F applied by the roller 13 vary with the variation in the standard displacement u0.

The calculator 33 acquires the strain amounts detected by the strain sensors 14a and 14b, calculates the pressing force F on the basis of the strain amounts and the characteristic diagram (illustrated in FIG. 8) stored in the storage unit 32, and outputs the result of calculating the pressing force F to the storage unit 32 and the display unit 6 (in step S7). Thus, the pressing force F applied upon the processing of the line is stored in the storage unit 32 and displayed by the display unit 6.

After the processing of the line is completed, the calculator 33 determines whether or not the pressing force F applied upon the processing of the line and stored in the storage unit 32 is lower than the allowable pressing force Ft stored in the storage unit 32 in advance (in step S8). If the pressing force F is lower than the allowable pressing force Ft, the process proceeds to step S9. If the pressing force F is not lower than the allowable pressing force Ft, the process proceeds to step S13.

If the pressing force F is lower than the allowable pressing force Ft (Yes in step S8), the calculator 33 outputs the alarm command signal to the alarm unit 7 (in step S9). Thus, the alarm unit 7 provides the alarm sound. The alarm sound can notify the user that the pressing force F applied upon the processing of she line is lower than the allowable pressing force Ft.

In addition, the calculator 33 calculates the correction amount δu of the displacement u of the arm 25 from the characteristic diagram illustrated in FIG. 9 and outputs the result of calculating the correction amount δu to the display unit 6 (in step S9). Thus, the correction amount δu of the displacement u of the arm 25 is displayed by the display unit 6.

Specifically, the calculator 33 calculates the correction amount δu on the basis of: the minimum pressing force Fmin that is among pressing force F applied upon the processing of the line and stored in the storage unit 32 and lower than the allowable pressing force Ft; the characteristic diagram indicating the relationship between the pressing force and the deflection of the beam and stored in the storage unit 32 in advance; the initial deflection vs in the storage unit 32 in advance; and the maximum variation δu0 (initial value of 0.5 mm) of the standard displacement u0 in the storage unit 32 in advance (refer to FIG. 9).

After the calculation of the correction amount δu, the maximum variation δu0 is changed to a variation of (δu0+δu). The initial deflection vs and the initial pressing force Fs that are indicated in the characteristic diagram illustrated in FIG. 9 are changed on the basis of the change in the maximum variation δu0. Specifically, the initial deflection vs and the initial pressing force Fs are increased by an increase in the maximum variation δu0.

Next, the correction amount δu displayed on the display unit 6 is input to the computer 3 from the input unit 5 (in step S10).

The calculator 33 acquires the correction amount δu from the input unit 5 and controls the tool driving device 2 so that the displacement u of the arm 25 is equal to a value of (u+δu) (in step S11). Specifically, the calculator 33 outputs, on the basis of the correction amount δu input from the input unit 5, the correction displacement command to change the displacement u of the arm 25 by the correction amount δu to the tool controller 4 and drives the Z-axis driving device 28 through the tool controller 4 so that the displacement u of the arm 25 is equal to the value of (u+δu).

While the displacement u of the arm 25 is maintained at the value of (u+δu), the Y-axis driving device 23 is driven so that the same line is processed again from the other end to the one end in the direction opposite to the direction of step S6 (in step S12).

The process returns to step S7, and the calculator 33 acquires strain amounts detected by the strain sensors 14a and 14b, calculates the pressing force F, and outputs the result of calculating the pressing force F to the storage unit 32 and the display unit 6 (in step S7). Thus, the pressing force F applied upon the reprocessing of the line is stored in the storage unit 32 and displayed on the display unit 6.

Next, after the line is reprocessed in step S12, the calculator 33 determines whether or not the pressing force F applied upon the reprocessing of the line and stored in the storage unit 32 is lower than the allowable pressing force Ft stored in the storage unit 32 in advance (in step S8).

If the pressing force F is not lower than the allowable pressing force Ft (No in step S8), the X-axis driving device 26 is driven to shift the roller 13 by a predetermined pitch p in X-direction as illustrated in FIG. 5 and set the roller 13 in order to process the next line in the opposite direction (in step S13). In this case, the roller 13 is set in order to prepare to process the next line. In the present embodiment, the roller 13 is shifted by the pitch p in X-direction upon the completion of the processing of each of lines from one end to the other end of the line in Y-direction, and each of the lines is processed in Y-direction from the other end to one end of the line so that the overall groove bottom portion 107 is processed by the burnishing processing.

Next, it is determined whether or not the roller 13 has reached at an X-directional processing end position at which the processing is completed (in step S14). If the roller 13 has yet to reach the X-directional processing end position (No in step S14), the process returns to step S3, and the next line is processed by repeating the aforementioned procedure. On the other hand, if the roller 13 reaches the X-directional processing end position (Yes in step S14), the processing is completed.

The initial pressing force Fs to be set in step S5 for the next line varies for the following two cases. The initial pressing force Fs to be set in the case where the all answers to step S8 for the processing of previous lines are negative (or in the case where all the previous lines are not reprocessed) is different from the initial pressing force Fs to be set in the case where an answer to step S8 for the processing of at least one previous line is positive (or in the case where at least one previous line is reprocessed).

If all the previous lines are not reprocessed, the initial pressing force Fs to be set in step S5 for the next line is equal to the initial pressing force Fs set in step S5 for the previous lines.

On the other hand, if at least one of the previous line is reprocessed, the initial pressing force Fs to be set in step S5 for the processing of the next line is equal to the initial pressing force Fs changed in step S9 for the processing of the previous line.

As described above, the burnishing can be performed on the surface (to be processed), which is included in the object to be processed and of which the height and inclination angle vary, without measuring the inclination angle θ, while a part that is insufficiently pressed is not left.

In steps S9 to S11, the correction amount δu calculated by she calculator 33 is output to the display unit 6, displayed on the display unit 6, and input to the computer 3 from the input unit 5, and the calculator 33 outputs the correction displacement command to the tool controller 4 on the basis of the input correction amount δu and controls the displacement u of the arm 25 through the tool controller 4. The correction amount δu calculated by the calculator 33, however, may not be input to the computer 3 from the input unit 5, and the calculator 33 may output the correction displacement command to the tool controller 4 on the basis of the result of calculating the correction amount δu and control the displacement u of the arm 25 through the tool controller 4.

Besides, in the aforementioned example, steps S1 to S3, S5, S6, S10, and S12 to S14 are manually performed, but may be automatically performed by control of the computer.

Next, results of outputting processing records displayed on the display unit that constitutes a part of the burnishing device according to the first embodiment of the invention are described with reference to FIG. 13.

Figure 13:
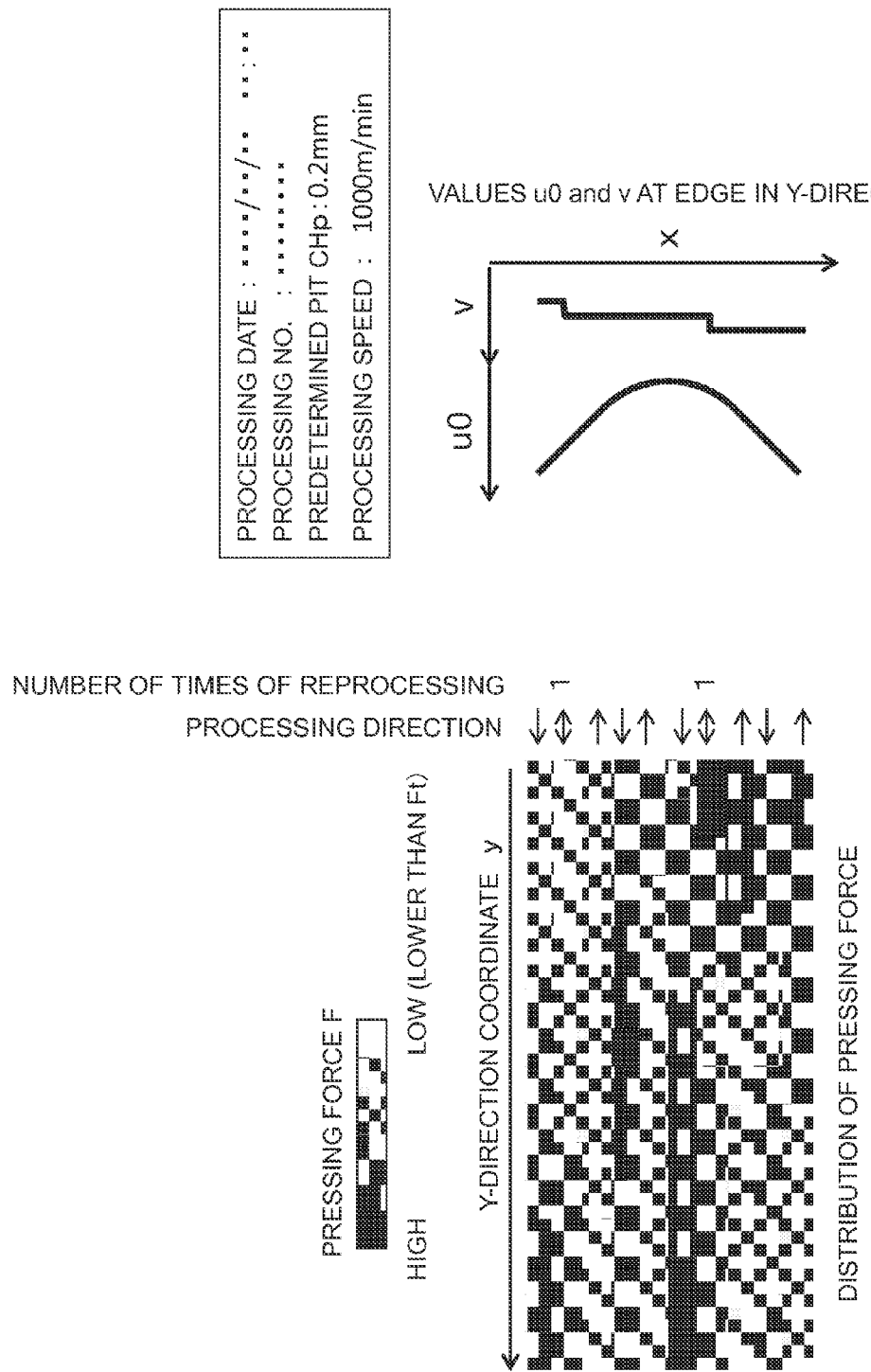
FIG. 13 is a diagram illustrating a display screen of a display unit that displays processing records of the burnishing method performed by the burnishing device according to the first embodiment of the invention.

FIG. 13 is a diagram illustrating a display screen of the display unit that displays the processing records of the burnishing method performed by the burnishing device according to the first embodiment of the invention.

The display unit 6 displays the pressing force F applied by the roller 13 on X- and Y-coordinates upon the processing, while the displayed pressing force F is distinguished by colors indicating the magnitude of the pressing force F. Thus, the user can clearly confirm that a part that is insufficiently pressed does not exist.

The standard displacement u0 and deflection v at both ends in Y-direction, the number of times of reprocessing, a processing direction, the predetermined pitch p, and a processing speed are also displayed for each of processed lines. Thus, a processing state can be checked in detail when necessary.

As described above, according to the burnishing device according to the first embodiment of the invention and the burnishing method to be performed by the burnishing device, the pressing force F to be applied by the pressing unit 13 in the normal direction of the surface (to be processed) of the object 105 to be processed is calculated on the basis of the strain amounts of the burnishing tool 1, and the pressing unit 13 presses the surface (to be processed) on the basis of the calculated pressing force F. The burnishing processing can be reliably performed on the surface (to be processed), which is included in the object 105 to be processed and which has a change in height and inclination angle. As a result, the service life of the object 105 to be processed can be increased.

According to the present embodiment, since the displacement u of the arm 25 is controlled on the basis of the pressing force F calculated on the basis of the strain amounts detected by the strain sensors 14a and 14b, it is not necessary that information of the shape of the rotor attachment base 105 be input to the tool driving device 2. In addition, even if a detailed shape of an object to be processed is not clear, the object can be processed.

Further, according to the present embodiment, the relationships of balance between the pressing force F applied by the roller 13 to the surface (to be processed) of which the inclination angle θ varies, the friction force f applied in the tangential direction of the surface to be processed, the shearing force W of the beam 11, and the axial force B of the beam 11 are calculated as the characteristic relationships between the pressing force F, the shearing force W of the beam 11, and the axial force B of the beam 11, as illustrated in FIG. 8. Thus, the pressing force F to be applied by the roller 13 in the normal direction of to the surface (to be processed) of which the inclination angle θ varies can be calculated without measuring the inclination angle θ.

According to the present embodiment, the burnishing tool 1 uses a beam scheme in which the roller 13 presses the surface using the deflection reaction force of the beam. Thus, the burnishing tool 1 can reliably perform the burnishing processing on the object (such as the rotor attachment base 105) that is to be processed having a narrow inner surface.

According to the present embodiment, since the measured pressing force F is distinguished by the colors indicating the magnitude of the pressing force F and displayed, the quality of the burnishing can be easily managed in detail when necessary.

Second Embodiment

Next, the burnishing device according to the second embodiment of the invention is described with reference to FIGS. 3, 8, and 14.

Figure 14:
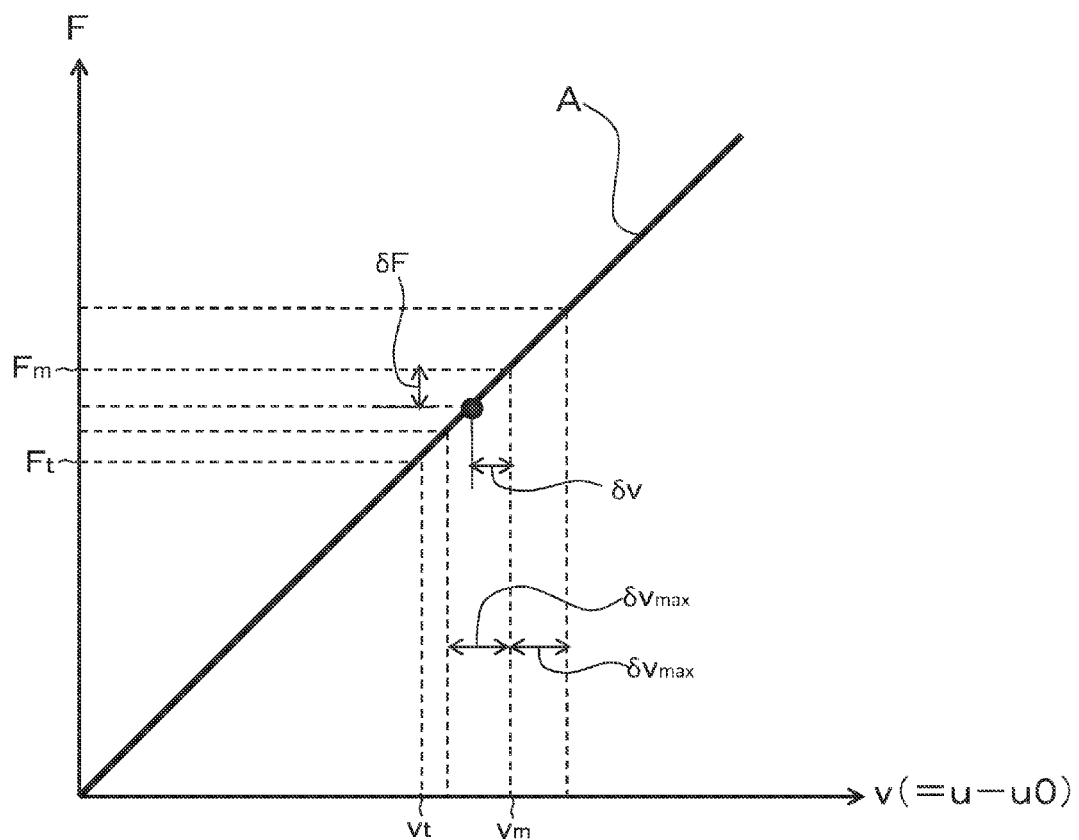
FIG. 14 is a characteristic diagram illustrating the relationship between pressing force and deflection of the beam upon burnishing performed by the burnishing device according to a second embodiment of the invention.

FIG. 14 is a characteristic diagram illustrating the relationship between the pressing force F and deflection of the beam upon the burnishing performed by the burnishing device according to the second embodiment of the invention. Reference symbols that are illustrated in FIG. 14 and the same as those illustrated in FIGS. 1 to 13 indicate the same parts as those illustrated in FIGS. 1 to 13, and a detailed description thereof is omitted.

The second embodiment is different in the following point from the first embodiment. In the first embodiment, the burnishing is performed while the displacement u of the arm 25 is fixed, and if a processing failure is detected, the displacement u of the arm 25 is corrected on the basis of the measured pressing force F and the burnishing is performed again. In the second embodiment, however, the displacement u of the arm 25 is sequentially corrected on the basis of the pressing force F measured during the processing.

The computer 3 that constitutes a part of the burnishing device according to the second embodiment includes the input/output (I/O) unit 31, the storage unit 32, and the calculator 33 (refer to FIG. 3). The storage unit 32 stores various characteristic diagrams and various set values in advance. The calculator 33 calculates the pressing force F to be applied by the roller 13 in the normal direction of the surface (to be processed) on the basis of values detected by the strain sensors 14a and 14b and the characteristic diagrams and calculates a deflection correction amount δ of the deflection v of the beam 11 on the basis of the calculated pressing force F, the characteristic diagrams, and the set values.

The storage unit 32 stores the characteristic diagram indicating the relationships of balance between the pressing force, the friction force, the shearing force of the beam 11, and the axial force of the beam 11 upon the burnishing, in order for the calculator 33 to calculate the pressing force F (refer to FIG. 8). In addition, in order for the calculator 33 to calculate the correction amount δv of the deflection v of the beam 11, the storage unit 32 stores a characteristic diagram indicating the relationship between the pressing force and the deflection of the beam 11, the allowable pressing force Ft, allowable deflection vu (of the beam 11) corresponding to the allowable pressing force Ft on the characteristic diagram, target pressing force Fm set from the characteristic diagram in order for the pressing force F to be applied by the roller 13 to be equal to or higher than the allowable pressing force Ft, and a target control value vm corresponding to the target pressing force Fm and provided for the deflection v (refer to FIG. 14 described later).

The calculator 33 acquires the detection signals of the strain sensors 14a and 14b, calculates the pressing force F to be applied by the roller 13 on the basis of the detection signals of the strain sensors 14a and 14b and the characteristic diagram (illustrated in FIG. 8) stored in the storage unit 32, and outputs the result of calculating the pressing force F to the storage unit 32 and the display unit 6. In addition, the calculator 33 sequentially calculates the deflection correction amount δv of the deflection v of the beam 11 on the basis of the calculated pressing force F and the target pressing force Fm stored in the storage unit 32 so that the pressing force F is equal to the target pressing force Fm, as described later. Then, the calculator 33 sequentially outputs the correction displacement command to change the displacement u of the arm 25 by the deflection correction amount δv to the tool controller 4.

Next, a specific method for calculating the correction amount to be used to sequentially correct the displacement u of the arm 25 during the processing is described with reference to FIG. 14.

FIG. 14 is a characteristic diagram illustrating the relationship between the pressing force and the deflection of the beam upon the burnishing performed by the burnishing device according to the second embodiment of the invention. In FIG. 14, the ordinate indicates the pressing force F to be applied by the roller 13, and the abscissa indicates the deflection v of the beam 11. In FIG. 14, a solid line A is a characteristic curved line indicating the relationship between the pressing force and the deflection of the beam when a condition that causes the ratio F/W (illustrated in FIG. 8) to be smallest is selected.

In FIG. 14, the allowable pressing force Ft and the allowable deflection vt corresponding to the allowable pressing force Ft are values set to obtain the predetermined compressive residual stress.

If the maximum deviation from a target value of the deflection v is indicated by δvmax, the target pressing force Fm and the target control value vm, of the deflection v corresponding to the target pressing force Fm are set in order to control the deflection v of the beam 11 so that the pressing force F to be applied by the roller 13 is maintained at the allowable pressing force Ft or higher.

The allowable pressing force Ft, the allowable deflection vt, the target pressing force Fm, the target control value vm, and the characteristic diagram are stored in the storage unit 32.

To calculate the correction amount of the displacement u of the arm 25, the difference δF (=F−Fm) obtained by subtracting the target pressing force Fm from the pressing force F calculated on the basis of the detection signals of the strain sensors 14a and 14b and the characteristic diagram illustrated in FIG. 8 is calculated. Next, the deflection correction amount δv (of the deflection v of the beam 11) that corresponds to the difference δF is calculated. The deflection correction amount δv is equal so the correction amount of the displacement u of the arm 25.

As is apparent from FIG. 14, when the displacement u of the arm 25 is changed by the deflection correction amount δv, the deflection v of the beam 11 becomes equal to the target control value vm.

The characteristic curved line A illustrated in FIG. 14 indicates the relationship between the pressing force F and the deflection v when the condition that causes the ratio F/W to be smallest is selected on the characteristic diagram illustrated in FIG. 8. Since the shearing force W is in proportion to the deflection v, the ratio F/v is also smallest. Thus, the pressing force F calculated from the characteristic curved line A is set to a low value for safety.

Next, a burnishing method to be performed by the burnishing device according to the second embodiment of the invention is described with reference to FIGS. 3, 8, and 14 to 16.

Figure 15:
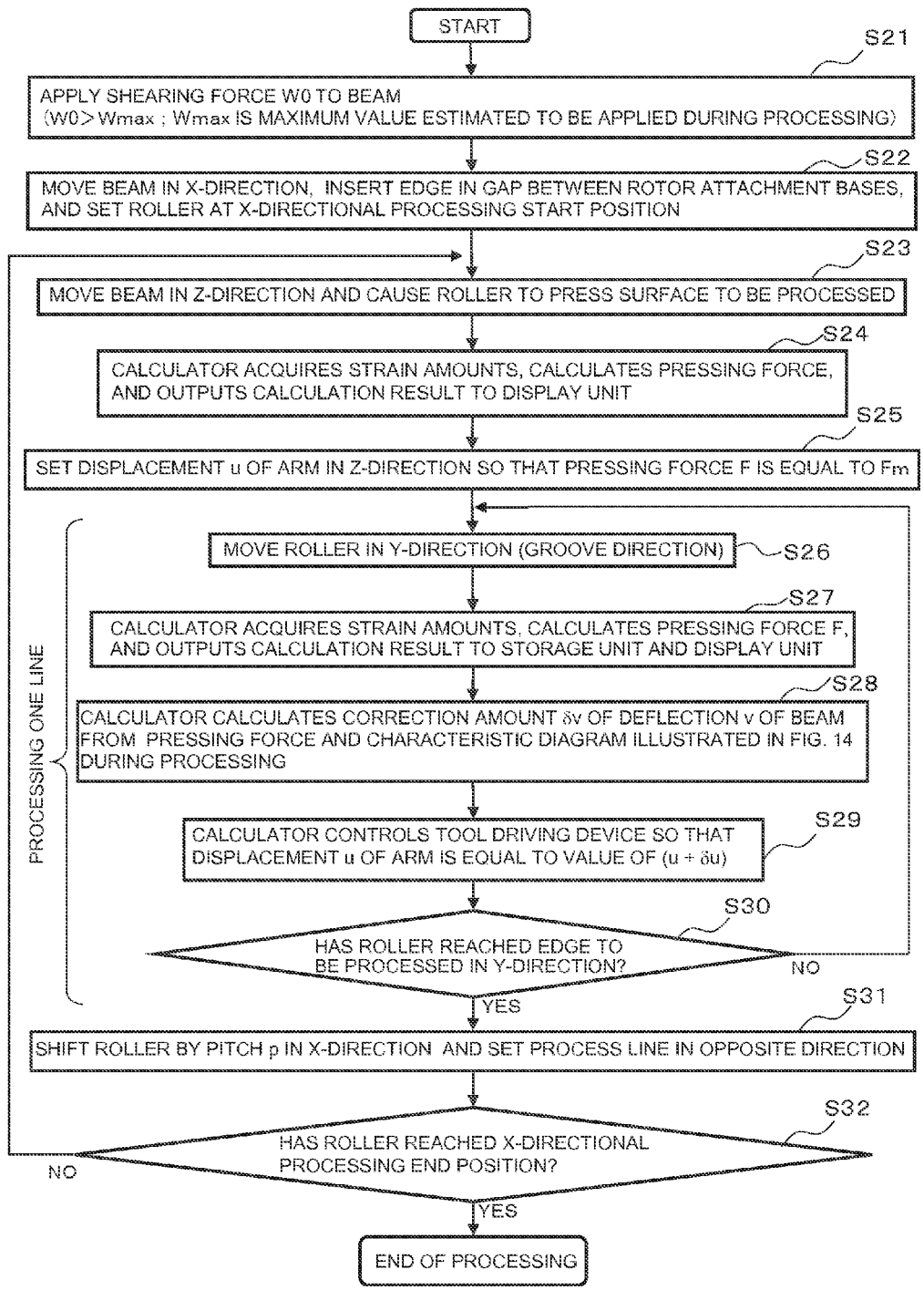
FIG. 15 is a flowchart of a burnishing method to be performed by the burnishing device according to the second embodiment of the invention.
Figure 16:
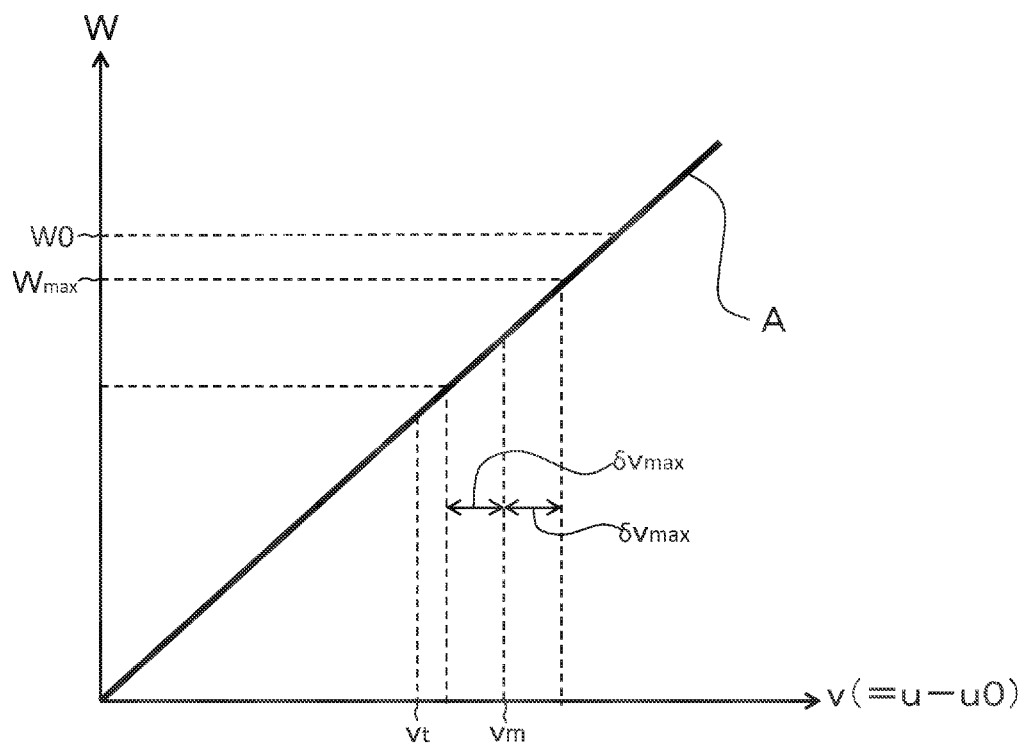
FIG. 16 is a characteristic diagram illustrating the relationship between shearing force of the beam and the deflection of the beam upon the burnishing performed by the burnishing device according to the second embodiment of the invention.

FIG. 15 is a flowchart of the burnishing method to be performed by the burnishing device according to the second embodiment of the invention. FIG. 16 is a characteristic diagram indicating the relationship between the shearing force of the beam and the deflection of the beam upon the burnishing performed by the burnishing device according to the second embodiment of the invention. Reference symbols that are illustrated in FIGS. 15 and 16 and the same as those illustrated in FIGS. 1 to 14 indicate the same parts as those illustrated in FIGS. 1 to 14, and a detailed description thereof is omitted. In FIG. 15, the direction in which the burnishing tool is inserted is X-direction, the direction in which the groove bottom portions of the rotor attachment bases extend is Y-direction, and the direction in which the burnishing tool is pressed against the rotor attachment base 105 is Z-direction.

As illustrated in FIG. 15, the shearing force W0 that is higher than the maximum shearing force Wmax estimated to be applied to the beam 11 upon the processing is applied to the beam 11 before the burnishing processing (in step S21).

A method for determining the maximum shearing force Wmax of the beam 11 is described below with reference to FIG. 16.

FIG. 16 is a characteristic diagram illustrating the relationship the shearing force of the beam and the deflection of the beam upon the burnishing performed by the burnishing device according to the second embodiment of the invention. In FIG. 16, the ordinate indicates the shearing force W of the beam, and the abscissa indicates the deflection v of the beam 11. In FIG. 16, a solid line A is a characteristic curved line indicating the relationship between the shearing force of the beam and the deflection of the beam under the condition that the ratio B/W is 0 and causes the ratio F/W to be smallest.

The maximum shearing force Wmax is determined as the shearing force to be applied to the beam 11 when the deflection v of the beam 11 is estimated to be shifted by up to a value δvmax from the target control value vm.

Since the characteristic curved line A illustrated in FIG. 16 indicates the relationship between the shearing force of the beam and the deflection of the beam under the condition that the ratio B/W is 0 and causes the ratio F/W to be smallest in FIG. 8, the maximum shearing force Wmax (of the beam) calculated from the characteristic curved line A is set to a high value for safety.

Returning to FIG. 15, in the same manner as the first embodiment, the beam 11 illustrated in FIG. 3 is moved in X-direction, the edge of the beam 11 is inserted in a gap between the rotor attachment bases 105, and the roller 13 is set on the groove bottom portion 107 of the rotor attachment base 105 at the X-directional processing start position at which the processing starts to be performed (in step S22). In addition, the beam his moved in Z-direction (pressing direction) and the roller 13 is pressed against the groove bottom portion 107 (in step S23). When the roller 13 presses the groove bottom portion 107, the beam 11 is deflected, and the strain sensors 14a and 14b detect the strain amounts of the beam 11 and output the strain amounts to the calculator 33.

In the same manner as the first embodiment, the calculator 33 acquires the strain amounts detected by the strain sensors 14a and 14b, calculates the pressing force F on the basis of the strain amounts and the characteristic diagram (illustrated in FIG. 8) stored in the storage unit 32, and outputs the result of calculating the pressing force F to the display unit 6 (in step S24). Thus, the pressing force F is displayed on the display unit 6.

The displacement u of the arm 25 in Z-direction is set so that the pressing force F to be applied by the roller 13 is equal so the target pressing force Fm (in step S25). As described above, the target pressing force Fm is set so that the pressing force F applied by the roller 13 can be maintained at the allowable pressing force Ft or higher even if the deflection v of the beam 11 is shifted by up to the value δvmax from the target control value vm.

The roller 13 is moved on the groove bottom portion 107 in Y-direction (groove direction) and processes the groove bottom portion 107 (in step S26). During the processing, the deflection v of the beam 11 and the pressing force F applied by the roller 13 change with a variation in the standard displacement u0.

In the same manner as the first embodiment, the calculator 33 acquires the strain amounts detected by the strain sensors 14a and 14b, calculates the pressing force F on the basis of the strain amounts and the characteristic diagram (illustrated in FIG. 8) stored in the storage unit 32, and outputs the result of calculating the pressing force F to the storage unit 32 and the display unit 6 (in step S27). Thus, the pressing force F is stored in the storage unit 32 and displayed on the display unit 6.

During the processing, the calculator 33 calculates the deflection correction amount δv of the deflection v of the beam 11 from the pressing force F and the characteristic diagram illustrated in FIG. 14 (in step S28). Specifically, the calculator 33 calculates the difference δF (=F−Fm) between the calculated pressing force F and the target pressing force Fm stored in the storage unit 32 and calculates the correction amount δv of the deflection v of the beam 11 on the basis of the difference δF and the characteristic diagram indicating the relationship between the pressing force and the deflection of the beam and stored in the storage unit 32 (refer to FIG. 14).

After the calculation of the deflection correction amount δv, the calculator 33 controls the tool driving device 2 so that the displacement u of the arm 25 is equal to a value of (u+δv) (in step S29). Specifically, the calculator 33 outputs, to the tool controller 4 on the basis of the calculated deflection correction amount δv, a correction displacement command to change the displacement u of the arm 25 by the deflection correction amount δv and drives the Z-axis driving device 28 through the tool controller 4 so that the displacement u of the arm 25 is equal to the value of (u+δv).

Next, it is determined whether or not the roller 13 has reached an end to be processed in Y-direction (in step S30). If the roller 13 has yet to reach the end to be processed in Y-direction, the process returns to step S27. If the roller 13 has reached the end to be processed in Y-direction, the process proceeds to step S31.

If the roller 13 has yet to reach the end to be processed in Y-direction (No in step S30), the processing in Y-direction is continuously performed by causing the process to return to step S26 and repeating the aforementioned procedure until the roller 13 reaches the end to be processed in Y-direction.

In this manner, the calculator 33 sequentially calculates the pressing force F on the basis of the strain amounts detected by the strain sensors 14a and 14b, calculates the correction amount δv of the deflection v of the beam 11 on the basis of the result of calculating the pressing force F, and sequentially controls the displacement u of the arm 25 on the basis of the deflection correction amount δv so that the displacement u of the arm 25 is equal to the value of (u+δv) during the processing of one line. Thus, the displacement u of the arm 25 is sequentially controlled so that the pressing force F applied by the roller 13 is maintained at the target pressing force Fm. In other words, the processing in Y-direction is progressed while feedback control is performed so as to maintain the pressing force F at the target pressing force Fm.

When the roller 13 reaches the end to be processed in Y-direction (Yes in step S30), the roller 13 is shifted by the predetermined pitch p in X-direction and set to process the next line in the opposite direction (in step S31). In this case, the roller 13 is set in order to prepare to process the next line. In the present embodiment, the roller 13 is shifted by the pitch p in X-direction upon the completion of the processing of each of the lines in Y-direction, and the lines are processed in the opposite direction so that the overall groove bottom portion 107 is processed by the burnishing.

Next, it is determined whether or not the roller 13 has reached the X-directional processing end position at which the processing is completed (in step S32). If the roller 13 has yet to reach the X-directional processing end position at which the processing is completed (No in step S32), the process returns to step S23, and the next line is processed by repeating the aforementioned procedure. If the roller 13 has reached the X-directional processing end position at which the processing is completed (Yes in step S32), the processing is completed.

In the aforementioned example, steps S21 to S23, S25, S26, S31, and S32 are manually performed, but may be automatically performed by control of the computer.

As described above, the burnishing device and the burnishing method performed by the burnishing device according to the second embodiment can obtain effects that are the same as those obtained in the first embodiment.

According to the present embodiment, since the displacement u of the arm 25 is sequentially corrected during the processing of one line so that the pressing force F applied by the roller 13 is maintained at the target pressing force Fm during the processing of one line, a step of reprocessing a line due to insufficiency of the pressing force F applied by the roller 13 is not necessary, and the time for the processing can be reduced. In addition, it is possible to prevent the roller 13 from excessively pressing the object 105 to be processed and prevent the object 105 to be processed from being damaged due to the processing.

Third Embodiment

Next, a burnishing device according to a third embodiment of the invention is described with reference to FIGS. 17 to 19.

Figure 17:
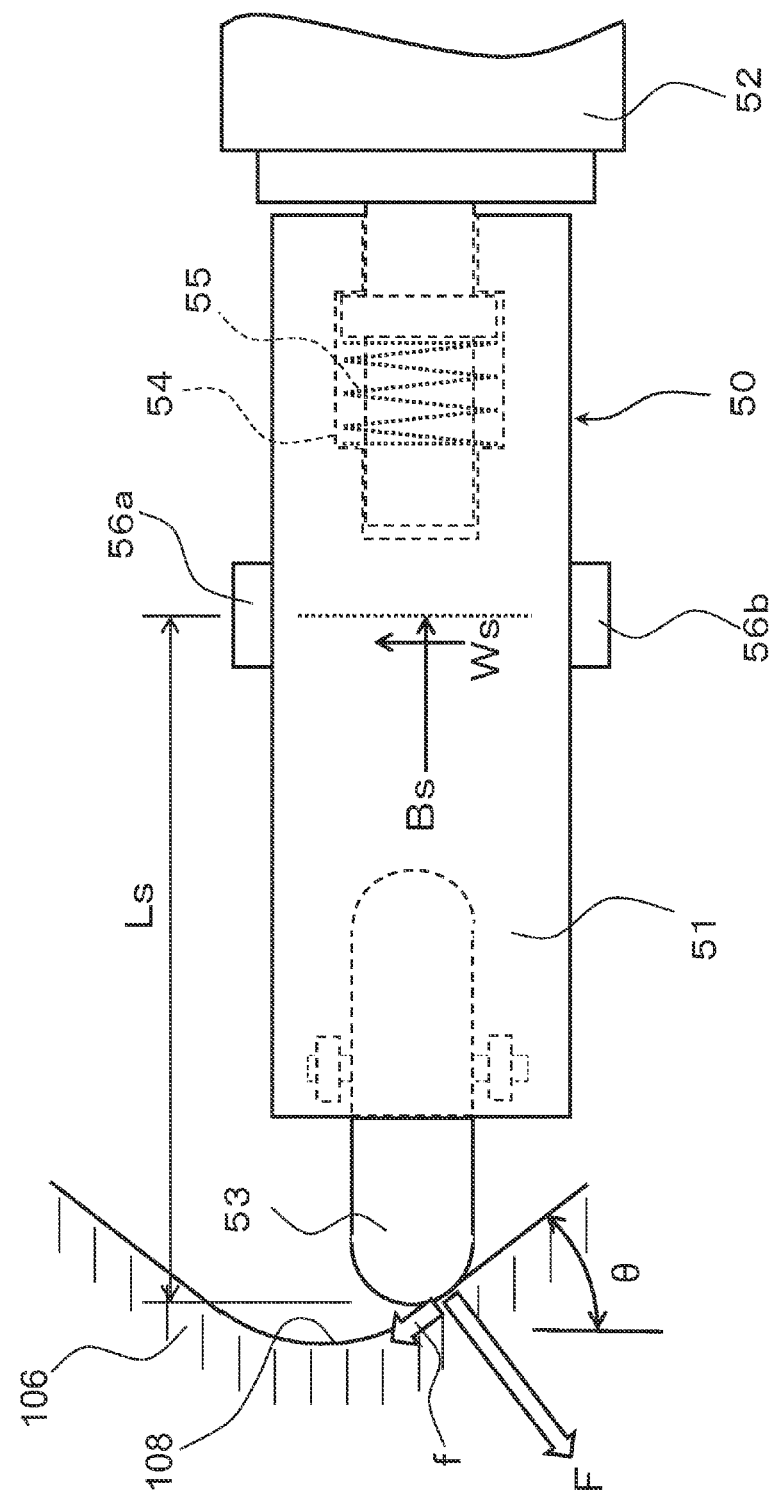
FIG. 17 is a diagram illustrating a burnishing device according to a third embodiment of the invention and the relationship between pressing force and friction force that are applied to an inclined surface (to be processed) and shearing force and axial force that are applied to an axial force shaft upon the burnishing.

FIG. 17 is a diagram illustrating the burnishing device according to the third embodiment of the invention and the relationship between the pressing force and the friction force that are applied to the inclined surface to be processed and shearing force and axial force that are applied to an axial force shaft upon the burnishing. FIG. 18 is a diagram describing the burnishing performed on a blade attachment base of a turbine blade by the burnishing device according to the third embodiment of the invention. FIG. 19 is a characteristic diagram indicating relationships of balance between the pressing force, the friction force, the shearing force of the axial force shaft, and the axial force of the axial force shaft upon the burnishing by the burnishing device according to the third embodiment of the invention. Reference numerals and symbols that are illustrated in FIGS. 17 to 19 and the same as those illustrated in FIGS. 1 to 16 indicate the same parts as those illustrated in FIGS. 1 to 16, and a detailed description thereof is omitted.

While the burnishing tool 1 that constitutes a part of the burnishing device according to the first embodiment uses deflection reaction force of the beam and presses the edge of the tool against the object to be processed in the first embodiment, a burnishing tool 50 (illustrated in FIG. 17) that is included in the burnishing device according to the third embodiment of the invention uses axial force to press an edge of the tool against the object to be processed in the third embodiment.

The burnishing tool 50 includes the axial force shaft 51, a fixing portion 52, a roller 53, and a spring mechanism 54 for displacement absorption. The fixing portion 52 is arranged at one end of the axial force shaft 51 in a longitudinal direction of the axial force shaft 51. The roller 53 is arranged on a surface of the other end of the axial force shaft 51 in the longitudinal direction of the axial force shaft and serves as a pressing unit that presses the surface (to be processed) of the object to be processed. The spring mechanism 54 is arranged in the axial force shaft 51. The burnishing tool 50 uses the axial force of the axial force shaft 51 to cause the roller 53 to press the surface to be processed.

The roller 53 is capable of rotating around an axial direction perpendicular to the longitudinal direction of the axial force shaft 51.

The spring mechanism 54 has a function of using a spring 55 included in spring mechanism 54 to absorb a variation in the height of the surface to be processed during the processing, preventing the pressing force F applied by the axial force shaft 51 from excessively varying, and stabilizing the pressing force F.

Strain sensors 56a and 56b are arranged on upper and lower surfaces (both end portions of the axial force shaft 51 in a shearing direction during the burnishing) of a central portion in the longitudinal direction of the axial force shaft 51.

Figure 18:
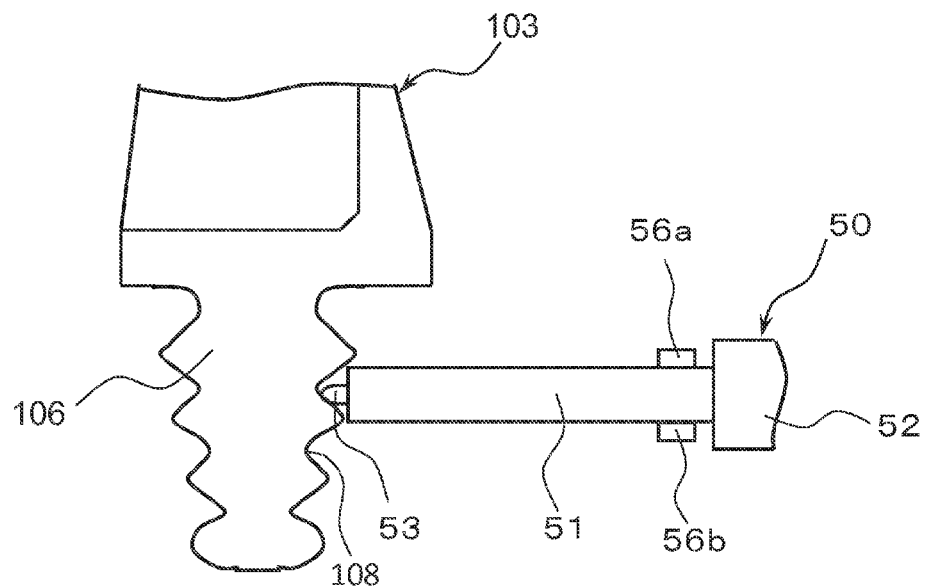
FIG. 18 is a diagram describing the burnishing to be performed on a blade attachment base of a turbine blade by the burnishing device according to the third embodiment of the invention.

In the present embodiment, as illustrated in FIG. 18, the burnishing can be performed on the object (such as the blade attachment base 106 of the turbine blade 103), which is to be processed and in which the burnishing tool 50 can be inserted in the same direction as the pressing direction.

Next, a specific method for calculating the pressing force to be applied by the roller 53 from values measured by the strain sensors 56a and 56b is described with reference to FIGS. 17 to 19.

In the present embodiment, a method for pressing the surface (to be processed) using the axial force of the axial force shaft 51 is used instead of the deflection reaction force of the beam 11 that constitutes a part of the burnishing device according to the first embodiment, and the following equations for calculating the pressing force F from values measured by the strain sensors 56a and 56b are used, unlike the first embodiment.

The axial force Bs of the shaft 51 and the shearing force Ws of the shaft 51 are calculated according to the following Equations (8) and (9) using strain amounts $\epsilon a$, $\epsilon b$ measured by the strain sensors 56a and 56b.

$$Bs=(\epsilon a+\epsilon b)/2 \cdot Es \cdot As \quad (8)$$

$$Ws=(\epsilon a-\epsilon b)/2 \cdot Es \cdot Zs/Ls \quad (9)$$

In Equations (8) and (9), Es is a Young's modulus of the axial force shaft 51, Zs is a section modulus of the axial force shaft 51, As is a cross-sectional area of the axial force shaft 51, and Ls is a distance between an edge of the roller 53 and the strain sensors 56a and 56b.

At an edge portion of the axial force shaft 51, the pressing force F applied by the roller 53 in the normal direction of the surface to be processed, the friction force f applied in the tangential direction of the surface to be processed, the axial force Bs of the shaft 51, and the shearing force Ws of the shaft 51 are balanced. When the inclination angle of the surface to be processed is indicated by $\theta$ (absolute value), the following Equations (10) to (12) are established on the basis of balance of force acting in the vertical and horizontal directions.

$$F \cos \theta + f \sin \theta = Bs \qquad (10)$$

$$F \sin \theta - f \cos \theta = Ws \qquad (11)$$

$$f = \min\{\mu F, F \tan \theta\} \qquad (12)$$

In Equation (12), $\mu$ is a coefficient of friction.

If the inclination angle $\theta$ of the surface to be processed is small, a vertical force component of the pressing force F and the friction force f are balanced and the shearing force Ws of the shaft 51 is 0. In this case, since the roller 53 does not slide on the surface to be processed and the force is balanced, $\mu F > F \tan \theta$ and the friction force f is $F \tan \theta$.

On the other hand, if the inclination angle $\theta$ of the surface to be processed is large, the vertical force components of the pressing force F and the friction force f are not balanced, the roller 53 tries to slide on the surface to be processed, and the shearing force Ws of the shaft 51 occurs. In this case, since the roller 53 tries to slide on the surface to be processed, $\mu F < F \tan \theta$ and the friction force f is $\mu F$.

Figure 19:
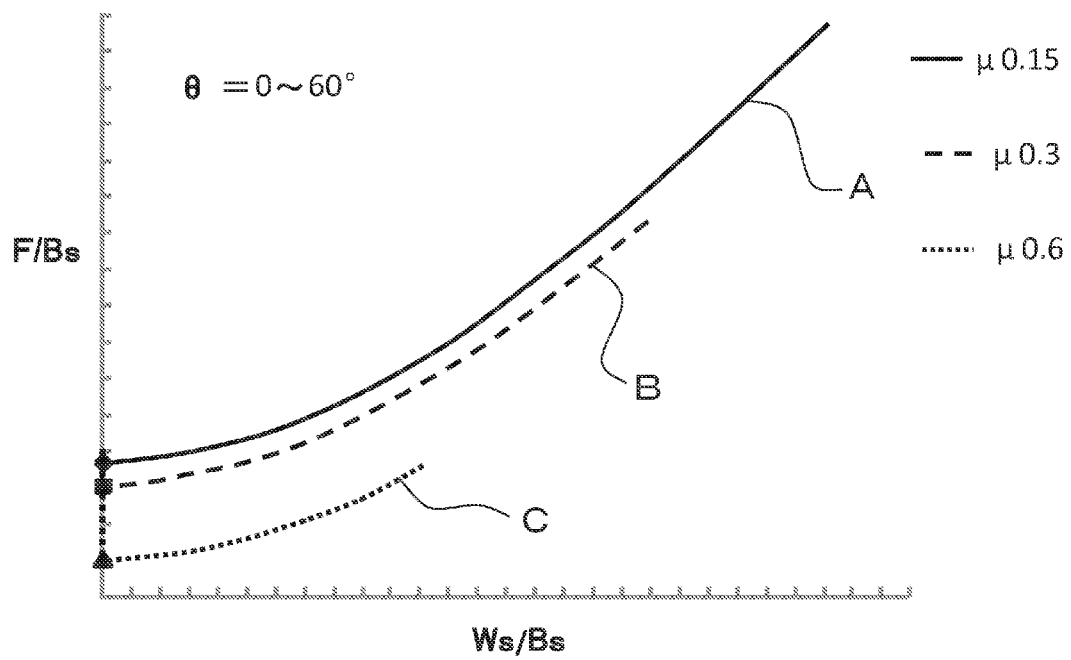
FIG. 19 is a characteristic diagram illustrating relationships of balance between the pressing force, the friction force, the shearing force of an axial force shaft, and the axial force of the axial force shaft upon the burnishing performed by the burnishing device according to the third embodiment of the invention.

The relationships of Equations (10) to (12) can be represented as the characteristic diagram illustrated in FIG. 19. In FIG. 19, the ordinates indicates the ratio F/Bs of the pressing force F applied by the roller 53 to the axial force Bs of the shaft 51, and the abscissa indicates the ratio Ws/Bs of the shearing force Ws of the shaft 51 to the axial force Bs of the shaft 51. In FIG. 19, a solid line A, a broken line B, and a dotted line C are characteristic curved lines obtained in the cases where the coefficient $\mu$ of friction are 0.15, 0.3, 0.6, respectively. An appropriate coefficient $\mu$ of friction is selected on the basis of results measured by a separate examination.

The axial force Bs of the shaft 51 and the shearing force Ws of the shaft 51 are calculated using Equations (8) and (9) on the basis of the values measured by the strain sensors 56*a* and 56*b*. Thus, the ratio F/Bs (indicated by the ordinate) is calculated from the ratio Ws/Bs (indicated by the abscissa) determined by the axial force Bs and shearing force Ws that are calculated using a characteristic curved line that is selected on the basis of the results of examining the coefficient $\mu$ of friction from among the characteristic curved lines A, B, and C indicated in the characteristic diagram illustrated in FIG. 19. The pressing force F can be calculated from the ratio F/Bs.

If the shearing force Ws of the shaft 51 is 0, the ratio F/Bs is not uniquely determined. Thus, a value (plot in FIG. 19) on a curved line is used in order to estimate a low value for safety. In this case, an error of the ratio F/Bs (indicated by the ordinate) is up to 14% even when the coefficient $\mu$ of friction is 0.6.

In the present embodiment, the pressing force F can be calculated without measuring the inclination angle $\theta$ for the burnishing performed on the object (to be processed) of which the inclination angle $\theta$ of the surface (to be processed) (such as the blade attachment base 106) varies.

For the procedure of the burnishing method performed in the present embodiment, the burnishing method used in the first and second embodiments can be used. In this case, since the axial force Bs of the shaft 51 is used to press the surface to be processed, the axial force Bs of the shaft 51 is used for a variation in the pressing direction of the burnishing tool, instead of the shearing force W of the beam 11. Note that the deflection reaction force of the beam is used to press the surface to be processed in the first and second embodiments.

As described above, the burnishing device according to the third embodiment of the invention uses the method for pressing the surface using the axial force of the axial force shaft 51. Thus, the burnishing processing can be reliably performed on a surface (to be processed) of an object (such as the blade attachment base 106 of the turbine blade 103) in which the burnishing tool can be inserted in the same direction as the pressing direction, while the height and inclination angle of the surface to be processed vary.

Others

Although the first embodiment describes the example in which the rotor attachment base 105 of the rotor disk 102 is used as the object to be processed, the blade attachment base 106 of the turbine blade 103 may be used as the object to be processed.

In addition, although the first to third embodiments describe the example in which the rotor attachment base 105 of the rotor disk 102 and the blade attachment base 106 of the turbine blade 103 are processed, an object that is to be processed and has a surface which has a change in height and inclination angle may be processed. The burnishing devices according to the first to the third embodiment are effective to process, for example, a device that is a bearing housing of a vehicle part or the like and has a corner portion in order to improve the strength of the device.

Although the roller is used as a pressing unit in each of the first to third embodiments, it is sufficient if the pressing unit forms a compressive residual stress layer on an object to be processed, and a ball may be used as the pressing unit.

In addition, it is sufficient if the tool driving device 2 according to the first to third embodiments can control the burnishing tool in at least X-, Y- and Z-directions.

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

Note also that some or all of the aforementioned components, functions, processors, and the like can be implemented by hardware such as an integrated circuit or the like. Alternatively, those components, functions, and the like can be implemented by software as well. In the latter case, a processor can interpret and execute the programs designed to serve those functions. The programs, associated data tables, files, and the like can be stored on a stationary storage device such as a memory, a hard disk, and a solid state drive (SSD) or on a portable storage medium such as an integrated circuit card (ICC), an SD card, and a DVD.

Further note that the control lines and information lines shown above represent only those lines necessary to illustrate the present invention, not necessarily representing all the lines required in terms of products. Thus, it can be assumed that almost all the components are in fact interconnected.

The invention claimed is:

1. A burnishing method comprising the steps of:
    causing a pressing unit, which a burnishing tool of a burnishing device has, to press a surface of an object to be processed,
    moving the pressing unit by a tool driving device of the burnishing device so that pressing force applied by the pressing unit in a normal direction of the surface of the object is equal to a predetermined pressing force;

rotationally moving the pressing unit by the tool driving device in a direction in which the surface of the object to be processed is processed;

calculating pressing force to be applied by the pressing unit in the normal direction of the surface of the object on the basis of a strain amount of the burnishing tool detected by a strain sensor of the burnishing device during the rotational pressing of the pressing unit in the processing direction, the pressing force in the normal direction of the surface of the object being correlated with a magnitude of compressive residual stress formed by burnishing;

calculating a correction amount on the basis of the calculated pressing force and stored pressing force in advance; and controlling the tool driving device so that the displacement of the tool driving device in the pressing direction is corrected on the basis of the calculated correction amount.

2. The burnishing method according to claim 1, wherein:
the step of calculating the correction amount is performed if the calculated pressing force is lower than the stored pressing force.

3. The burnishing method according to claim 1, wherein:
the step of correcting the displacement of the tool driving device in the pressing direction is sequentially performed during the step of rotationally moving the pressing unit in the processing direction.

4. The burnishing method according to claim 1, wherein the burnishing tool includes:
a beam capable of being inserted in a narrow portion of the object to be processed; and
the pressing unit arranged on an edge of the beam and capable of rotating around an axial direction parallel to a longitudinal direction of the beam.

5. The burnishing method according to claim 1, wherein the burnishing tool includes:
an axial force shaft; and
the pressing unit arranged on an edge of the axial force shaft and capable of rotating around an axial direction perpendicular to a longitudinal direction of the axial force shaft.

* * * * *